US012711827B1

(12) United States Patent
Thomson

(10) Patent No.: US 12,711,827 B1
(45) Date of Patent: Aug. 18, 2026

(54) SYSTEMS AND/OR METHODS FOR TARGETED OPINION POLLING WITH ANONYMITY

(71) Applicant: Free Speech Inc., Dover, DE (US)

(72) Inventor: Alexander Graeme Thomson, Bethesda, MD (US)

(73) Assignee: FREE SPEECH, INC., Dover, DE (US)

( * ) Notice: Subject to any disclaimer, the term of this patent is extended or adjusted under 35 U.S.C. 154(b) by 0 days.

(21) Appl. No.: 19/326,369

(22) Filed: Sep. 11, 2025

(51) Int. Cl.
*G07C 13/00* (2006.01)
*H04L 9/32* (2006.01)

(52) U.S. Cl.
CPC ............ *G07C 13/00* (2013.01); *H04L 9/3213* (2013.01)

(58) Field of Classification Search
CPC .............................. G07C 13/00; H04L 9/3213
USPC .......................................................... 235/386
See application file for complete search history.

(56) References Cited

U.S. PATENT DOCUMENTS 10,979,225 B1 4/2021 Shiralkar et al.
12,002,297 B1 6/2024 Smith
2012/0191774 A1 7/2012 Bhaskaran et al.
2015/0348173 A1* 12/2015 Gillen ................ G06Q 30/0635 705/26.81
2020/0258338 A1 8/2020 Goswami et al.
2023/0274290 A1 8/2023 Stewart
2023/0394901 A1 12/2023 Sarkar et al.
2024/0086949 A1 3/2024 Priebatsch et al.
2024/0420533 A1* 12/2024 Choi ..................... H04L 67/306

FOREIGN PATENT DOCUMENTS

EP 3 629 308 A1 4/2020
KR 10-2017-0138650 12/2017
WO WO 2020032504 A1 2/2020

OTHER PUBLICATIONS

"*Election Audits via Blockchain*" by Voatz, Inc (voatz.com) published 2025 (4 pages).
"*Voting Online, Simplified with ElectionBuddy—ElectionBuddy*", <https://electionbuddy.com/>, retrieved Aug. 20, 2025.
(Continued)

*Primary Examiner* — Ahshik Kim
(74) *Attorney, Agent, or Firm* — Nixon & Vanderhye, P.C.

(57) ABSTRACT

Examples of the present technology provide a platform for verified-anonymous community polling and referenda. The platform registers users, interfaces with external identity-verification services to confirm identity and eligibility attributes (e.g., geography, age, affiliation), and issues non-reversible participation tokens unlinkable to identity. Authorized creators (including elected officials) define communities, eligibility filters, demographic targets, and member-creation privileges, then publish polls delivered only to eligible user devices. The system enforces one person per poll via tokens, receives responses, and, in real-time, produces aggregate results and demographic breakdowns without storing or associating identities, while preventing the disclosure of individual-level data. The present technology can generate auditable reports with confidence metrics and can transmit the reports to user devices and an official interface that enables direct constituent access and subsequent verified referenda.

20 Claims, 27 Drawing Sheets

(56) References Cited

OTHER PUBLICATIONS

"eBallot _ Secure Online Voting Platform & Election Software", <https://www.eballot.com/capabilities >, retrieved Aug. 20, 2025.
"Online Voting Tool—Simply Voting", < https://www.simplyvoting.com/>, retrieved Aug. 20, 2025.
"Helios Voting", < https://vote.heliosvoting.org/>, retrieved Aug. 20, 2025.
"Secure Online Voting & nominations with POLYAS", < https://www.polyas.com/>, retrieved Aug. 20, 2025.

* cited by examiner

Figure 4A:
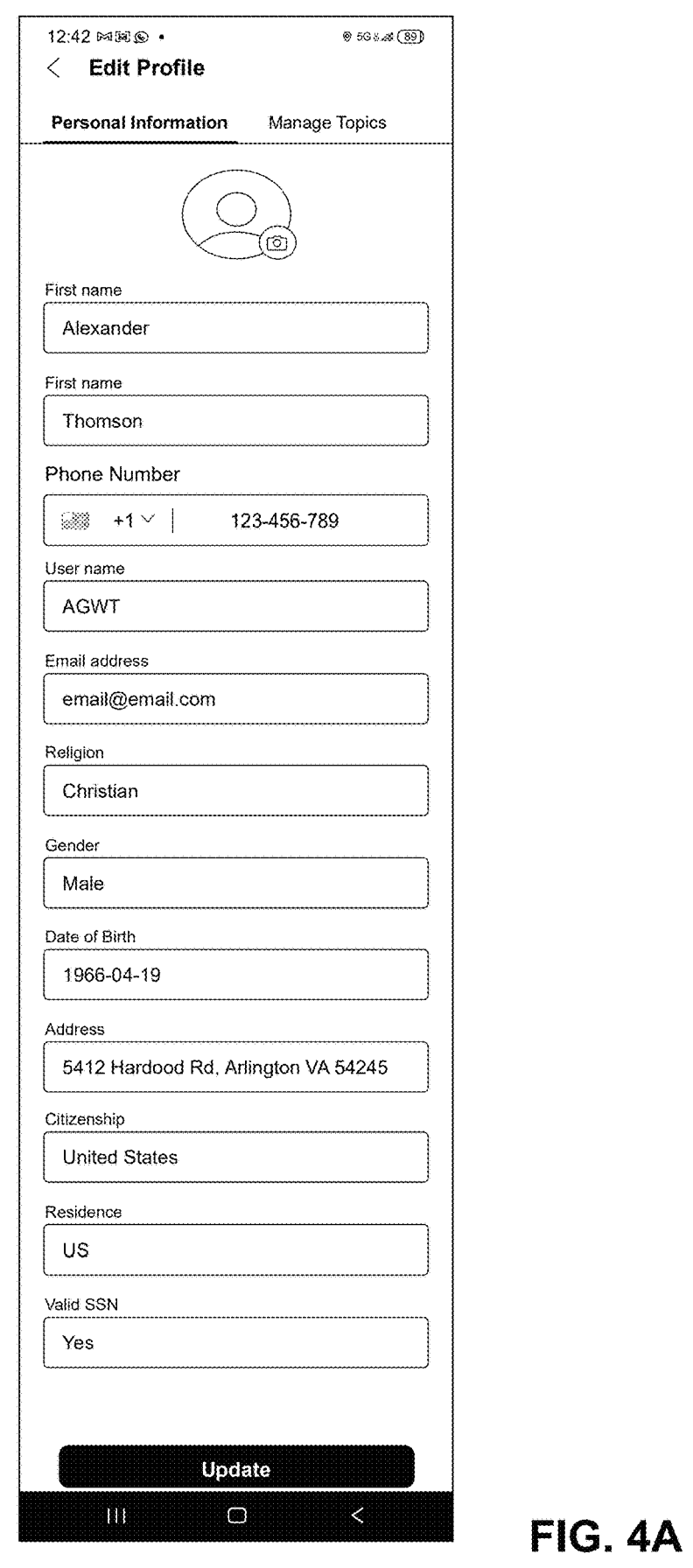

12:42

Edit Profile

Personal Information

Manage Topics

First name

Alexander

First name

Thomson

Phone Number

+1

123-456-789

User name

AGWT

Email address email@email.com

Religion

Christian

Gender

Male

Date of Birth 1966-04-19

Address

5412 Hardood Rd. Arlington VA 54245

Citizenship

United States

Residence

US

Valid SSN

Yes

Update

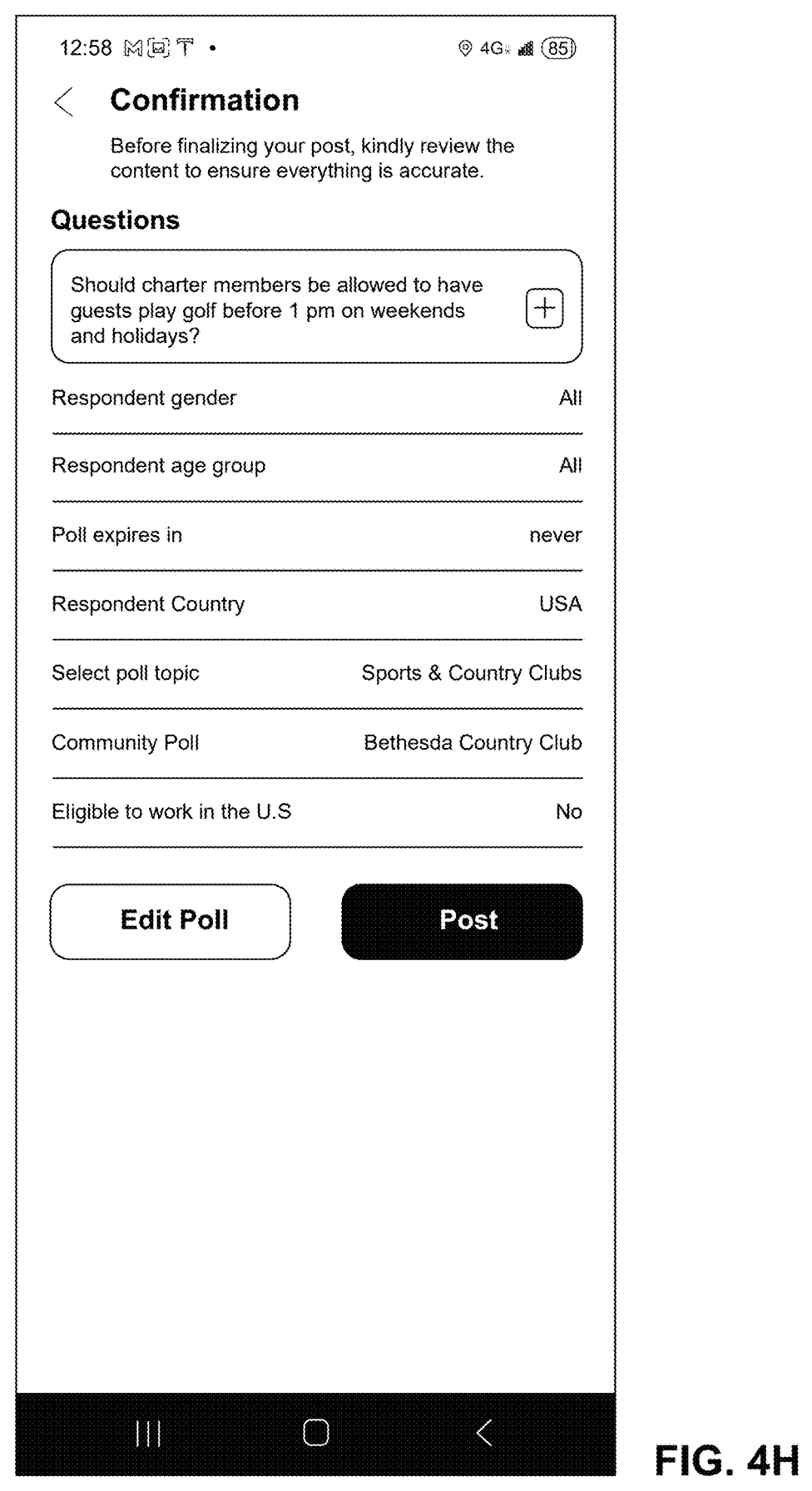

Confirmation

Before finalizing your post, kindly review the content to ensure everything is accurate.

Questions

Should charter members be allowed to have guests play golf before 1 pm on weekends and holidays?

Respondent gender All

Respondent age group All

Poll expires in never

Respondent Country USA

Select poll topic Sports & Country Clubs

Community Poll Bethesda Country Club

Eligible to work in the U.S No

Edit Poll

Post

FIG. 4H

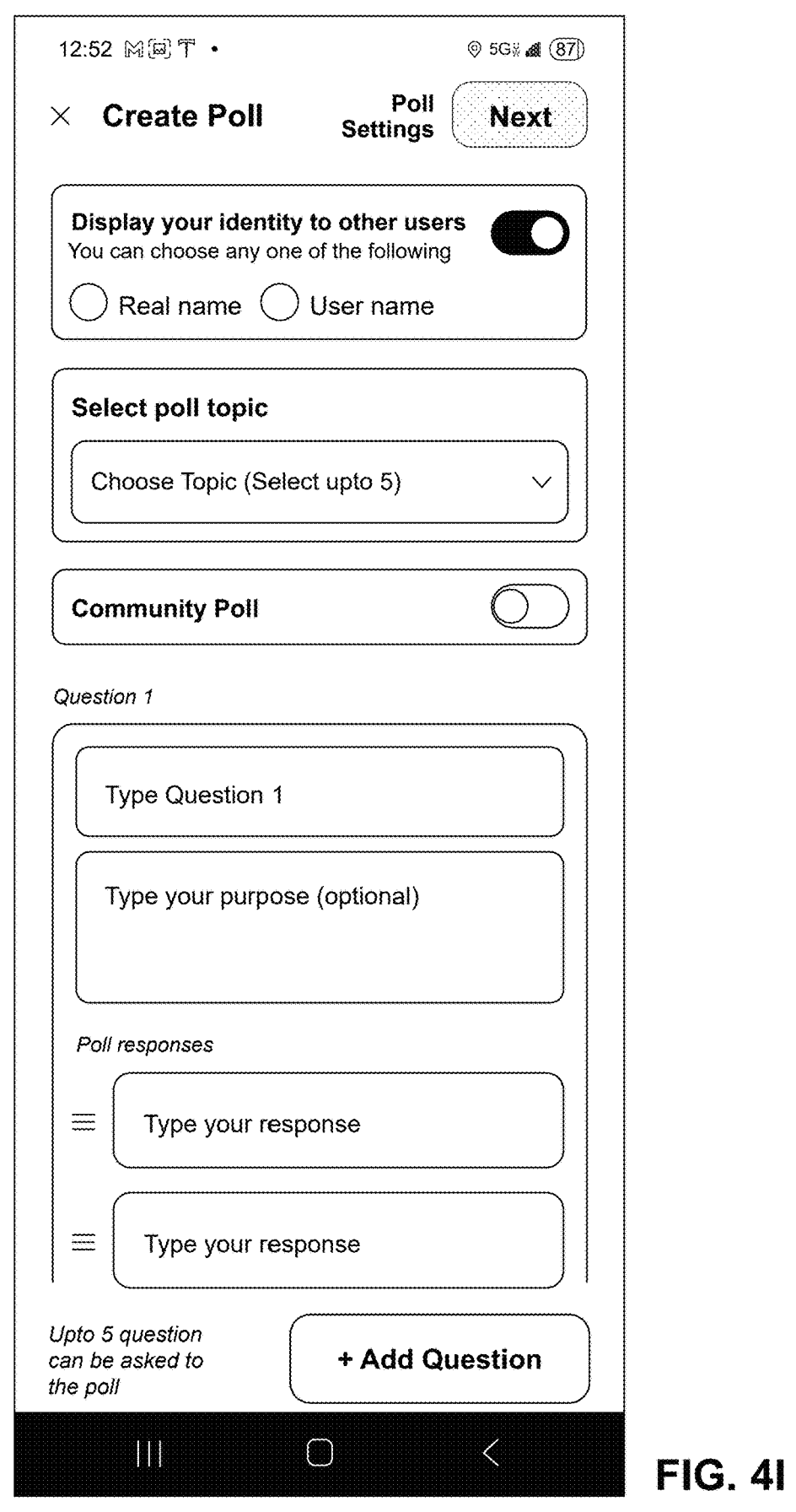

12:52
87
Create Poll
Poll Settings
Next
Display your identity to other users
You can choose any one of the following
Real name
User name
Select poll topic
Choose Topic (Select upto 5)
Community Poll
Question 1
Type Question 1
Type your purpose (optional)
Poll responses
Type your response
Type your response
Upto 5 question can be asked to the poll
+ Add Question

FIG. 4I

FREESPEECH
Protected by the 1st Amendment

Dashboard
Manage Users
Manage Poll
Manage Topic
Manage Community
Manage Sub-Admin
Manage Reported Poll
Manage Content
Manage Notification
Configure

46

Manage Reported Poll

Report Listing (From Date: 08-30-2024 To Date: 08-30-2025)

Total Report Count: 5

Search here...

Delete

Filter

| | Poll ID | Reported By | Report Date | Status | Action |
|---|---|---|---|---|---|
| | 934 | Vikral Drewan | 20/06/2025 | Open | |
| | 900 | Alexander Thomson | 19/06/2025 | Open | |
| | 902 | Adya Vikram | 16/06/2025 | Open | |
| | 814 | Alexander Thomson | 31/05/2025 | Open | |
| | 815 | Adya Vikram | 22/05/2025 | Open | |

FIG. 6G

SYSTEMS AND/OR METHODS FOR TARGETED OPINION POLLING WITH ANONYMITY

TECHNICAL FIELD

Certain examples of the present technology described herein relate to systems and/or methods providing targeted and/or anonymous polling and referendums, and more specifically, systems and/or methods for collecting, analyzing, and/or reporting opinion polling from an authenticated population of users using network connected devices.

BACKGROUND AND SUMMARY

The number of people using social media continues to grow. Some estimates predict that in 2025, 64% of the global population uses social media and captures about 94% of the internet users. While social media provides a platform for voicing individual opinions, mob mentality on social media suppresses individual behavior, opinion, or actions. Petitions on social media get buried and most polls are packed with bots that sway poll results. Expressing opinions on social media has caused some to lose friends, jobs, and endorsements.

In addition, well-funded extremists make a lot of noise. Elites, lobbyists, corporations, politicians, media filters, and cancel culture have taken over the national conversation. Meanwhile, the majority of people, who do not have the time to invest in civic engagement, are drowned out.

Accordingly, there is a need for a platform that can accurately reflect public opinion without the participants having a fear of losing their friends, jobs, or endorsement. In addition, there is a need for a platform that, amongst other uses, provides direct access to elected officials through instant, verified referendums, capturing real time sentiment from a relevant population for a given topic, to reduce the influence of elites, lobbyists, corporations, politicians, media filters, and cancel culture in local elections and decision making.

Furthermore, there is a need for a platform that provides an easy to use user interface to allow users of varying online experiences to easily participate in the process and a system that is easily expandable. Current social medial platforms include bulky systems providing a large number of features that require large processing power, large local and remote data storage, and compromises on security. Social media platforms also require large data storage in order to be able to track and store large amounts of data relating to user's interaction with the platform and other users. Certain example embodiments help address these issues by providing a light system that is easy to use, easily expandable, uses less processing resources and memory storage by the type of information that is stored and associated with the users.

The features, aspects, advantages, and example embodiments described herein may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 4A illustrates a profile screen including a plurality entry for registration information that may be entered by the user according to an example of the present technology.

FIG. 4G illustrates a poll setting screen that may be displayed in response to selecting poll settings option illustrated in FIGS. 4E and 4F, according to an example of the present technology.

FIG. 4H illustrates a poll posting confirmation screen for a created poll according to an example of the present technology.

FIG. 4I illustrates another example of a screen for creating a new poll according to an example of the present technology.

FIG. 6G illustrates an administrator user interface for managing reported polls according to an example of the present technology.

DETAILED DESCRIPTION

Figure 1:
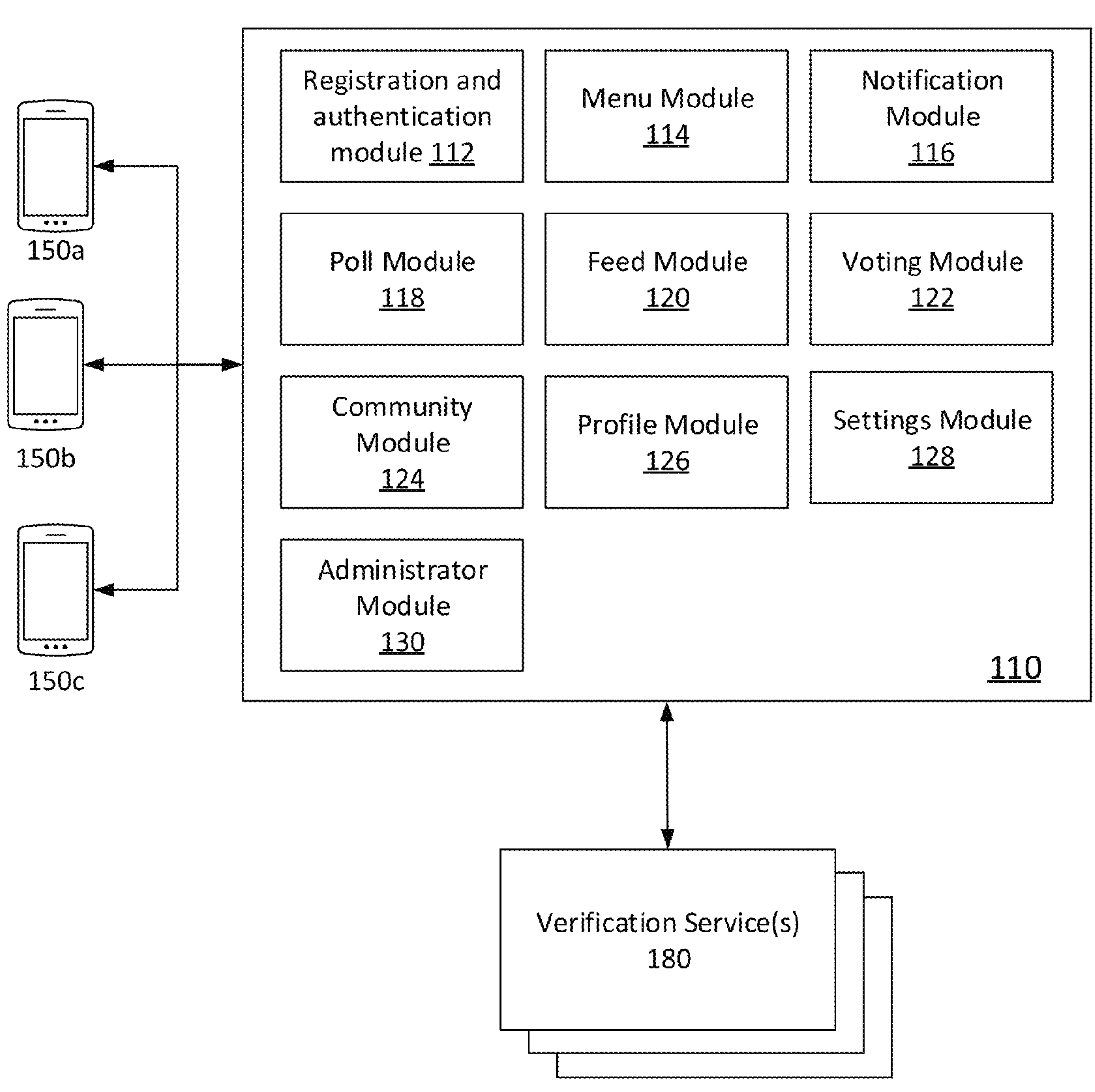
FIG. 1 illustrates a system for target opinion polling according to an example of the present technology.

Members of the community demand real transparency—not staged town halls, filtered media narratives, or poll-tested soundbites. They want direct, verifiable insight into policy decisions and the ability to make their voices heard—without interference. Examples of the present technology provide systems and methods that increase transparency by providing a secure, data-driven platform where elected or appointed officials and members of the community (e.g., voters) engage in real time. Unlike social media, where bots and fake accounts distort public opinion, examples of the present technology ensures participation by verified constituents. In addition, in contrast to other applications that provide platforms for running official election, examples of the present technology provide for real-world identity combined with privacy and grassroots reach (e.g., optimized targeting communities or districts, shareable sentiment) over cryptographic receipt-checking by voters. The system provide for verified-but-anonymous civic polling, targeted to real constituents (or a pre-defined subset of constituents), with data designed to provide officials, officers, boards, media and users participating in the polling with insight into polling results.

Examples of the present technology can help members of a community to see where their community stands on critical issues. Moreover, elected or appointed officials may receive authentic, data-backed feedback without media bias or special interest interference. Targeted demographic polling provided by the present technology can effectively allow policymakers to hear directly from the relevant members, whether local business owners, parents, or workers with the rights and interests in the policymaker's region of interest. Examples of the present technology can provide civic engagement that is instant, verifiable, and free from manipulation, ensuring that policy is shaped by genuine public sentiment, not manufactured narratives.

Certain examples of the present technology described herein relate to systems and/or methods providing targeted and anonymous polling. The systems and/or methods may collect user information and responses from an authenticated population of users, analyze the collected information, and generate opinion polling reports based on the analysis. The systems and/or methods may collect the user information and responses from network connected devices associated with the users, and provide the opinion polling reports to the network connected devices associated with the users. The opinion polling reports are provided without storing and identifying how specific users voted in the poll. The systems and/or methods may provide a platform including a privacy-focused polling application for users, enabling identified participation in public and community-based polls. Users subscribe to a plan before they can create polls, communities, or participate in polls. After subscription and registration, users can select interest categories, verify their identity via third-party integrations, and create/manage polls and communities with anonymity controls. The platform may include an admin panel providing a centralized dashboard for system administrators and sub-administrators to manage all aspects of the platform. Administrators may manage users, sub-admins, roles, categories, subscriptions, and reported content through a comprehensive back-office portal. Administrators cannot see how users respond to any polls. All votes remain anonymous and cannot technically be reported to outside third parties.

Certain examples of the present technology provide a verified-but-anonymous civic engagement platform that enables real constituents to express opinions and influence policy decisions in real time. Examples of the present technology combine verified identity (e.g., via a third party service) with guaranteed anonymity, targeted polling capabilities, and/or an ad-free, subscription-based model. Unlike official ballot return applications or organizational e-voting tools, examples of the present technology focus on ongoing engagement rather than formal elections. Examples of the present technology create real time referendums for elected officials to communicate/gather sentiment from targeted, verified constituents.

The present technology provides features that help to increase user interaction through engaging polls and community features, provide an architecture that can handle a growing number of users and polls, protect user data through secure authentication and data management practices, provide real time and responsive user experiences. The present technology also provides secure architecture (e.g., by utilizing state of the art, current technologies such as biometric, blockchain, end-to-end encryption), adaptable verification mechanisms (e.g., using third-party identity verification, and/or open voting, anonymity and privacy, auditability and transparency, regulatory compliance (e.g., for official elections), and/or improved user experience (e.g., ease of onboarding, clarity, accessibility). The secure architecture may be provided by utilizing one or more of the cloud service providers (CSPs) or colocation data centers, such as Amazon Web Services, Google Cloud, MSFT Azure, Oracle Cloud, Equinix, etc. to deliver the following: Securing user authentication, identity management, and authorization; token-based authentication with access managed through ID, Access, and Refresh tokens; Role-Based Access Control (RBAC) for restricting access to resources based on user roles; secure CSP Infrastructure that can be deployed within a secured CSP environment using Virtual Private Networks (e.g. AWS VPC, OCI VCN, MSFT VNet), Identity and Access Management (IAM) policies, and security groups; and/or audit logging for logging user activity and authentication events for compliance and monitoring.

The present technology also provides architecture that reduced the amount of processing resource and storage by storing poll results without association to personal information of the users. In some examples, the poll results may be stored without associating the poll results to demographic information of the users.

Examples of the present technology provide methods and systems for receiving results to poll that accurately reflect the opinions of the participants. Existing social media platforms are not able to provide such results because of users' fear of their views being revealed to the public. Similarly, receiving responses to polls in person by pollsters do not provide accurate results because only a fraction of the general population is willing to participate in such polls and users also fear of their personal information being associated with the poll results. In addition, it is not practical or possible for pollsters to survey a majority of the population within a limited amount of time to provide real-time and accurate poll results.

Certain examples of the present technology provide systems and methods that provide a polling application that prioritizes user anonymity. Users can sign up in the application configured to authenticate the identity of the users. The identity of the user can be verified using an external service (e.g., a third-party plaid). The application can allow the users to choose preferred categories and view past and/or present polls relating to the preferred categories. Using the application, the users may also create polls, which may be provided anonymously or in association with the user (e.g., displayed with a username and/or user's full or partial name), and/or create and manage communities, including user meeting specified conditions and community polls created for the community.

The application may provide administrative features for one or more administrators and/or one or more sub-administrators, to manage the users, polls, and communities. The application may provide an administrator with options to manage users, sub-administrators and their roles, reported posts, content, and categories. The application may provide a subscription model for organizations, allowing them to subscribe, add employees, and manage subscription plans through an administrator.

Certain examples of the present technology allow a user to share the poll results on social media to spotlight real support, send verified data straight to elected officials and leaders, and/or rally a club, team, or community. The present technology also allows users to remain anonymous while still shaping the outcome of a poll, allows users to observe how their input contributes to real time consensus, and/or influence change silently, without putting themselves in the spotlight.

FIG. 1 illustrates a system 100 for target opinion polling according to an example of the present technology. FIG. 1 presents a general description of the system 100 components including how a processing system 110 may be connected and configured to communicate with one or more user devices 150 and other components. Additional details about specific operations performed by the processing system 110 and/or functions can be found with reference to other figures. For clarity, only certain examples of system components are illustrated to describe the overall concept of the disclosed system. The system components may be provided in the same physical location or provided as a distributed processing system. In some examples, one or more of the system components may be provided in a cloud computing system.

The system 100 may be configured to execute an application that is structured with a monolithic architecture, integrating all its components seamlessly within a singular, unified codebase. This design may streamline the development process, making tasks like testing, maintenance, and debugging more straightforward. The system may also benefit from efficient scalability, allowing it to handle increased demand through vertical scaling.

The system 100 may include at least one processing system 110 (e.g., a server) configured to communicate with a plurality of user devices 150*a*, 150*b*, 150*c* that are associated with users. The user devices 150*a*, 150*b*, 150*c* may include a mobile device, phone, smartphone, tablet, notebook, laptop, desktop, polling station, and voting station. These terms generally describe a physical or virtual computing device that comprises at least one processor and memory, including computing instructions to perform operations on data such that one or more applications are executed. The mobile device may include a display or projection system for displaying information (e.g., polling question(s) and/or results) to the user and an input device for receiving information from the user in response to information displayed to the user.

The system 100 may provide a plurality of modules (e.g., including hardware and/or software components) configured to receive, process, and output data to users of the user devices 150*a*, 150*b*, 150*c* and/or other devices. While the modules are illustrated with reference to the processing system 110, in some examples of the present technology, a module and/or a feature provided by the module may be processor implemented using one or more processors of the processing system 110 and/or one or more processors of a user device. The features provided by the modules may include operations provided on the user device during execution of an application by the user device or an application provided in a browser of the user device. In some examples, features provided by one module may be separated into individual modules and/or one or more features from different modules may be combined into a same module. The architecture of system 100 may adopt a monolithic deployment model and leverages a comprehensive suite of a cloud based service (e.g., Amazon Web Services, Google Cloud, MSF Azure, Equinix, etc.) to deliver a secure, scalable, and resilient infrastructure, The processing system 110 may be configured to communicate (e.g., transmit and/or receive data) with one or more external verification service 180 for confirming the identity of the users associated with the user devices 150*a*, 150*b*, 150*c*. In some examples, the user devices 150*a*, 150*b*, 150*c* may communicate with the verification service 180 and provide results of such communication to the processing system 110.

The processing system 110 may be configured to provide a registration and authentication module 112. The registration and authentication module 112 may be configured to provide an onboarding process for the application's sign-up procedure. The sign-up procedure may include several steps to ensure user verification and customization. The sign-up procedure may include the user signing up using unique identification information associated with the user (e.g., user's name, mobile number and/or email). In some examples, a plurality of unique identifiers associated with the user may be requested and verified. For example, the user's mobile number and email may be requested and verified before allowing the user to sign up for the service, join a community, and/or participate in a poll. The registration and authentication module 112 may be integrated with an artificial intelligence model configured to match users with recommended communities. The communities may be recommended based on a user's creation of polls and/or participation in polls and training of the model performed based on communities to which other users belong and which polls they create and/or participate in. Because the application is configured to not keep track of how users vote in any polls, the artificial intelligence model is configured to provide recommendations without consideration of how users vote in the polls.

The registration and authentication module 112 may guide the user in performing verification of the unique identification information (e.g., user's mobile number and/or email) to confirm the user's association with the provided unique identification information. In some examples, the user may receive a one-time password (OTP) for each method, which is valid for a predetermined period of time (e.g., 1 hour, 6 hours, 12 hours, or 24 hours). Users can request OTP resends, with certain restrictions. The restrictions may include waiting a predetermined amount of time (e.g., 1 hour, 6 hours, 12 hours or 24 hours) before the OTP is resent.

After verification of the unique identification information, the registration and authentication module 112 may allow the user to log in using the unique identification information (e.g., user's mobile number and/or email) and a password created during the verification of the unique identification information or the log in. In one example, after verifying the unique identification information, the user is prompted to provide their registration information, including their first name, last name, username, email, phone number, etc. The registration information may include receiving a unique username. The user may be guided to provide a username that helps maintain anonymity. The registration and authentication module 112 may also require the user to accept the application terms and conditions in order to proceed with the registration process.

After providing the registration information, the user may be prompted to choose their interests from a list of predefined categories. A user may be shown a plurality of predefined interests and provided with instructions to select only a predefined number of interests, all categories of interest to the user from the displayed interests, or at least a predefined number of interests. The selected interests may be highlighted or displayed with a changed shape, size, and/or color in response to the selection. The users may be provided an option to add or remove categories as desired. In one embodiment, the user may be provided with an option to skip the selection of interest and proceed to a feed screen.

The registration and authentication module 112 may be configured to associate the user with a specific geographic region, voting district, organization, and/or community for which polls can be received. In one example, the registration and authentication module 112 may receive from the user geographic region, voting district, organization, and/or community identification and the authentication operation may confirm the user belongs to the designated geographic region, organization, and/or community. The geographic region may be identified based on the users authenticated residency address. The geographic region may be used for targeting polls to users belonging to the geographic region while protecting the region (e.g., country, state, county, city, community) from outside influence. Organizations and/or communities may provide users with confirmation codes, which may be unique to the organization or the user, to confirm that the user belongs to the organization and/or communities.

Overall, the onboarding process provided by the registration and authentication module 112 aims to streamline user registration while ensuring data security and personalization.

A menu module 114 may be configured to provide users with navigating through the application's key features. In some examples, the menu module 114 may provide hierarchical navigation of application features and/or navigate the user to different screens of the application. In one example, at least a portion of a menu including a plurality of icons may be always displayed during execution of the application. The menu module 114 may control display of menu icons including a notification bell icon, a home icon, my polls icon, my votes icon, and/or community icon. The notification bell icon may be displayed separate from the other icons and may direct the user to notifications in response to a selection. Selection of the home icon may navigate the application to a designated initial page (e.g., a feed screen of the user). Selection of the my polls icon may navigate the user to polls which the user can participate in. Selection of the my votes icon may navigate the user to polls the user has participated in the past. Selection of the community icon may navigate the user to communities to which the user belongs. By default, the home icon directing the user to a feed screen may be selected when the user logs into the application.

A notification module 116 may be associated with the notification bell icon, a poll module 118 may be associated with the my polls icon, a feed module 120 may be associated with the home icon, a voting module 122 may be associated with the my votes icon, and a community module 124 may be associated with the community icon.

The notification module 116 may provide notifications through various channels, including in-app notifications, push notifications, email notification, and/or text message notification for display on the user device. The notifications may be triggered by various events within or outside of the application to keep users informed about relevant updates, activities, or interactions. Notification may include availability of new polls, responses of other users to created polls, new activity within the user's communities. The user may access their notifications within the application, where they can view a list of received notifications. The user may be provided with options to modify how and what kind of notifications are received.

The poll module 118 may provide users with options for creating polls. Providing the user with options to create polls may allow the user to feel more part of the community and/or encourage the user to be more engaged with polls posted by other users. The poll module 118 may provide a poll entry screen allowing users to delete their own polls or create polls. The poll creation process includes adding questions, response options, and setting parameters like poll expiration and visibility. Users can preview their poll before submission, ensuring accuracy and completeness.

The feed module 120 may provide information to the user, for example, via a feed screen. In some examples, the feed screen may provide users with a personalized and exploratory experience, enhancing engagement with polls based on their interests. Users can choose between displaying categories of interest selected by the user, allowing them to sort and view polls based on most recent or trending criteria. In the feed screen, users can search for specific polls and participate by voting or viewing results. Users can report polls with predefined reasons or explanations. The feed screen can foster interaction and community engagement through polls tailored to users' interests and preferences.

A voting module 122 may provide the user with one or more voting screens including polls the user can participate in and/or polls the user has participated in the past. Selection of the My Polls icon may navigate the user to polls the user can participate in and/or polls the user has participated in. The polls the user can participate in may include polls that are available for the user to vote in. The polls that the user has participated in may include polls that the user has participated in within a set amount of time from a current date (e.g., within the last week, within the last month, within the last year), or a preset number of latest polls. The voting module 122 may provide the user with an option to change the number of present and/or past polls that are displayed, filter the past and/or present polls based on keywords, interests, and/or communities, and/or change how the polls are displayed (e.g., list view of tile view).

The available polls and/or completed polls may be displayed with poll information including time left to participate in the poll, the number of voters that participated, the number of voters left to participate, the number of questions, information about the creator of poll, one or more communities associated with the poll, and/or the topic of the poll.

In response to the selection of an available poll, the system may display a poll screen with question(s) and selectable responses. In one example, the poll screen may include a plurality of questions and a plurality of responses for each question. In another example, a separate screen may be generated for each question, and the question may be displayed simultaneously with the plurality of responses corresponding to the question. The question and available responses may be displayed with or without the current results of the poll. Whether the results of the poll are displayed before a response is received may be selected by the creator of the poll. In one example, the results of the poll may be displayed only after the poll is closed to voting for all users to reduce the possibility of current results influencing the user's response to the poll. The responses to the questions may be selectable from two or more predefined responses. The two or more responses may include a response to which a user can submit a custom response (e.g., write-in a candidate's name). In some examples, the response to the question may include a response that provides a varying scale between two responses (e.g., easy and hard, or important and not important), between two values representing a varying response (e.g., two between 1 and 5, between 0 and 10, between 0 and 100), or a varying scale between a three or more values (e.g., represented by a multidimensional graphic with a selectable position representing a response). In some examples, the response may include selectable graphics (e.g., thumb up or thumb down), with or without text next to the selectable graphics.

In some examples, the response to the poll cannot be altered after submission, maintaining the integrity of the poll and live results/sentiment. Previously responded to polls cannot be altered under any circumstances.

In response to the selection of a completed poll, the system may display a poll result screen with results of the poll. In one embodiment, the system may display the poll results of all users without displaying the response provided by the user, because the system may be configured to not keep track of the user responses after participating in the poll. In some examples, the results may include displaying a number of users and/or percentage of users that selected each response, a number of users that were provided with an option to participate in the poll, a total number and/or percentage of users that participated in the poll, a total number and/or percentage of users that did not participated in the poll, and/or manually entered responses. In some examples, the responses to the polls may be displayed with association to demographic information (e.g., gender, age, nationality, country, state, county, city, and/or zip code). The results of the poll can be displayed without including user name or user identification information (e.g., name, username, address, contact information) because the system can be configured to not associate the user identifying information with one or more responses.

The poll results can be displayed with graphics representing how the user responses change over time. In this example, the results may provide a timeline and show the user responses received to the question over time until the poll is closed. The poll results may include different graphics (e.g., color, shading, and/or shape) representing new responses and changes to previously received responses as the responses are received over time during the duration of the poll.

The feed module 120 and/or the voting module 122 may be integrated with an artificial intelligence model configured to match users with the most relevant polls for the user to participate in. In cases where a large number of users and/or polls are created, the user may be overleaved with a fees screen that includes an endless number of polls. The artificial intelligence model may be trained and configured to determine the most relevant polls based on other user's participation within the application, current events (e.g., based one news reports about weather, politics, or conflicts), and/or discussions on social platform(s). Because the application is configured to not keep track of how users vote in any polls, the artificial intelligence model is configured to provide recommendations without consideration of how users vote in the polls.

A community module 124 may provide a comprehensive platform for users to search, join, and manage communities effectively. Users can search for communities by name or category, with suggestions based on entered keywords. The result list may display community details, including name, image, creator, category, and privacy type, with options to join or requests to join, along with the ability to cancel previous requests. Joining a public or private community may include the user being displayed guidelines of the community and/or a confirmation icon selectable by the user confirming that they agree to follow the specific community guidelines.

Joining a public community may result in the user being automatically added to the community. Joining a private community may trigger a notification to a community administrator (e.g., creator of the community and/or designated administrators of the community) to authorize the request, request additional information before being allowed to join, initiate one or more additional verification processes to join the community (e.g., confirm association with an organization, provide authorization code, and/or upload membership information). In some examples, administrators of a community can view pending approvals and manage community settings, including privacy and deletion. An administrator of the community may be provided with options to facilitate community management, including adding and removing members, importing and/or exporting member lists (e.g., from an external file or database), and inviting new members.

A profile module 126 may be configured to receive and manage personal and/or demographic user information that is used for authentication of the user and/or granting user access to specific polls and/or communities. The profile module 126 may manage the user's personal information, which may include one or more of Full Name, Username, Phone Number, Email, Religion, eligibility to work and Verification Status. The user's personal information may include information that is entered by the user. The personal information may also include information that is retrieved from one or more third-party verification services. The retrieved information may include one or more of Date of Birth, Address, Citizenship, eligibility to work, and Country received from one or more third-party verification services.

The user may be provided with an option to modify the personal information, including First Name, Last Name, Phone Number, Email address via third party reverification. The retrieved information from the one or more third-party verification services may not be editable by the user.

The verification status may be seamlessly handled by a third-party service, involving the submission of all or a portion of the user's personal information and/or additional information (e.g., documents for verification). The document for verification may include a government issued identification document (e.g., license or a passport). The Verification Status may include displaying whether the verification process is pending, successful, or failed. If multiple services are used for verification, the Verification Status may indicate a separate status for each service or display a single indicator for all of the services.

In some examples, after the verification is complete, the information that is verified by the one or more third-party verification services may be indicated as being verified and would need to be re-verified if the user selects to change the verified information. As an example, if the user changed their name or address, the verification process may be repeated to confirm that the updated information corresponds to the user. In some examples, the user may request for the verification process to be repeated to automatically update the user's personal information that is verifiable. In some examples, the verification process may be repeated with or without the users request and/or authorization to confirm continued validity of the user's identity. The verification process may be repeated at predetermined intervals (e.g., once every year or once every two years), at predetermined timing (e.g., timing associated with the date of the user, timing associated with community voting events, and/or timing associated with public announcements).

The profile module 126 may also allow the user to select and/or update their interests. Updating the interests may provide the user with a screen allowing for the addition or removal of categories, with selected interests being indicated by highlighted or change in shape, size, and/or color. The user may be provided with a search feature to search for specific interests. In one example, the interest selection screen may be automatically populated with suggested interests that are determined based on the user's profile information, interests of other users in the user's one or more communities, and/or past participation in polls, or trending events.

A settings module 128 may be configured to provide a user with comprehensive control over their account preferences and access to specific resources. The settings module may include options such as changing passwords, accessing help and support, managing notifications, reviewing terms and privacy policies, rating the app, logging out securely, and deleting the account. Users can update their passwords with single or multi factor authentication security measures in place, ensuring the integrity of their accounts. Additionally, users can seek assistance directly from the administrator through email or chat, and access legal documents like terms and privacy policies. Instructional content on application functionality can be made available for user guidance. An option to rate the app may offer users a platform to share feedback and contribute to its improvement. A logout feature may allow for secure account management, while the ability to delete accounts provides users with the autonomy to manage their presence on the platform. Overall, the settings module may ensure a user-friendly and secure experience while using the application.

An administrator module 130 may be configured to provide administrators and sub-administrators with options for managing the features provided by the system 100. The administrator module 130 may provide an administrator onboarding module configured to secure access for administrators and sub administrators. Administrators may sign in with an email and password. Two Factor Authentication (2FA) may add security, requiring an OTP for each login. If an administrator forgets their password, they can reset it via an OTP sent to their email. New sub-administrators may log in with a temporary password from an invite email, then set a new password and complete 2FA. The administrator onboarding module may allow OTP resends and ensures secure, efficient access through multiple verification layers and easy password management.

The administrator module 130 may provide a dashboard module allowing administrators with comprehensive filtering and data visualization tools. A dashboard may display counts for various user categories and shows user growth, and user distribution through bar and donut graphs. The dashboard can provide polling category distribution and vote distribution by user type. Additionally, the dashboard may list the top preset number (e.g., 10) most followed users with details like username, follower count, and last activity date. Administrators can filter graphs and count by day (e.g., Today, Past week). Administrators can clear filters and navigate to detailed user and poll listings as needed. According to an example of the present technology, the administrator is not provided with information about how a user voted on any poll because the system is not configured to record how a user votes on the polls. The system may only provide that a user provided a response to a poll and associate user demographic information with the vote.

The administrator module 130 may provide the administrator with options to sort the list users by Username, User Type, Number of Followers, Last Activity Date, and Status. Filters include category and/or date range (e.g., Today, Past 1 week, month, year, or Custom). Administrators can view user details, select/unselect checkboxes individually or all at once, and use the delete button or status toggle accordingly. A function tab may offer insights into Created Polls, Responded Polls, Subscriptions, and Reports, each with search, sort, and filter capabilities. Administrators can sort polls by poll ID, date, and user type, and filter by category or date. Administrators can be provided with options to activate/deactivate user accounts with or without confirmation pop-ups and send email notifications. The delete function allows administrators to remove user accounts after confirmation, in response to user requests or abuse of community rules.

The administrator module 130 may provide the administrator with an option to sort a poll list by Poll ID, Created by, Created on date, and/or User type. Filters may include category and date range (Today, Past 1 week, month, year, or Custom). Administrators can view user list which includes Poll Id, Created By, Created on Date, User Type, Poll Category, Poll Reference and select/unselect checkboxes individually or all at once, and use the delete button or status toggle accordingly.

The administrator module 130 may provide the administrator with an option to view and/or sort the user poll details which include Created on, Created By, Poll ID, Poll Expires, Show Result to Respondent, Total Participants, Participant, User Type, Poll Reference.

The administrator module 130 may provide the administrator with an option to view poll responder details such as Respondent Gender, Respondent Age Group, Respondent Nationality, Respondent Country, Respondent State, Respondent County, Respondent City, and/or Respondent Zip Code for Community. While the administrator may view the demographic information for a particular community, the administrator is not provided how each user votes because the system is configured to not associate user identity with the voting result, nor is it technically possible for the administrator to provide that information to a third party.

The administrator module 130 may provide the administrator with an option to manage a community list by searching for communities by name, with suggestions provided based on one or more keywords. Sorting options may include Community Name, Creator Name, Created on Date, Members, and/or Privacy Type. A filter feature may allow for communities filtering by category and/or date range (e.g., today, past one week, month, year, or custom range). The administrator may be provided with options to view community details, including created date, community name, category, privacy type, description, member count, poll creation information, and/or voting statistics. Member lists of the community may display usernames and roles of the users, which may include administrator(s) and sub-administrator(s). Administrators can be provided with an option to send messages (e.g., emails, push notifications, text messages, notifications within the application) to community members, send and/or provide invitations to be added to the community, delete community members, and/or delete communities.

The administrator module 130 may provide the administrator with an option to manage categories by searching and sorting the categories, and taking actions on the categories. The searching and sorting of the categories may be performed by name, associated poll count, and status (active/inactive). Requests to add categories may be entered by the administrator and/or approved by the administrator when a request is made by other users. Requests for categories may be sorted by name, request, and/or date. Existing categories and/or category requests can be filtered by day (e.g., creation or requested) include today, past one week, month, year, or custom range. Authorization to enter a requested category may be accepted as proposed or with modifications to a name, declined with or without a reason input, add one or more new categories, edit categories (e.g., if no poll is associated with the category), and toggle status of a category (activate/deactivate).

The administrator module 130 may provide the administrator with an option to manage sub-administrators of the system and/or specific communities. Administrators may be provided with authorization to allow the sub-administrators authorization to perform one or more operations available to administrators, but the sub-administrators may not have an option to grant authorization for operations to other users. The managing option may include searching via Name, Email, and Phone, with suggestions based on keywords. The managing option may include filtering lists of users by rolls and/or sorting by Full Name and Status (active/inactive). The list of users displays details including Full Name, Email, Phone, Role, and Status, with actions to be taken for the user. The actions may include deleting the user, changing a status, and/or changing a role. Detailed views of the user lists may include profile pictures and activation toggles. Administrators can add sub-administrators with details about the sub-administrators (e.g., name, username, email, and/or phone number) and an automatic password generator for the sub-administrators, edit sub-administrators details, and/or toggle status (activate/deactivate).

The administrator module 130 may provide the administrator with options to manage notifications. Managing the notifications may include selecting types of notifications (e.g., Email, SMS, or Push notifications) and specifying recipient types. The administrators can be provided with an option to send notifications to all users of a selected type (based on user selected categories, demographic information, participation level) or search and select specific users by name or username. The administrators can input details, send notifications, schedule the sending of the notification, and view sent history categorized by Email, SMS, or Push. The administrator module 130 may provide the administrator with options to filter the sent and/or scheduled notifications by date (e.g., today, past one week, month, year, or custom range), and/or sort the notifications by name, date, or type. Displayed lists of sent and/or scheduled notifications can be viewed, deleted, and/or edited. In some examples, the administrator may be provided with an option to set up automated notifications to be transmitted to administrators, sub-administrators, and/or users based on the satisfaction of predetermined conditions (e.g., participating in a set number of polls, creating a set number of polls, being a member of a community for a predefined period of time).

In the notifications section of the user interface, administrators can check for new notifications or see a message indicating no new notifications. Notifications may display details including, title, summary, timestamp, and/or read status. In some examples, a notification that has not been read may be highlighted for visibility. The user interface may provide the administrators an option to mark all notifications as read with a single user input for efficient management. The administrators may receive in-web, email, and/or SMS notifications based on various trigger events, ensuring they stay informed across different platforms. These features facilitate a prompt response to updates and maintain communication clarity, enhancing administrator efficiency and responsiveness within the system.

The administrator module 130 may provide the administrator, in a configure section, options to manage roles, poll duration, and/or block time settings. Managing roles may include viewing, adding, editing, and/or deleting roles of users. The configure section may allow the administrator to specify user access to the Dashboard, User Management, Polls, Categories, Communities, Reports, Content, Notifications, and Configuration. Poll duration settings may allow users to view and update maximum poll durations. Block time settings enable users to view and update the number of days before user accounts are deactivated. These functionalities may provide comprehensive role management and customization of operational settings, enhancing administrative control and user experience management.

The administrator module 130 may provide the administrator options to manage content including Terms & Conditions, Privacy Policy, and How It Works section. The administrator can view and update these sections directly on the screen, ensuring the latest information is communicated to users. Terms & Conditions and Privacy Policy updates may be saved instantly upon confirming the changes and/or a notification may be automatically created, notifying administrators about the changes. The How It Works section may include text and/or video that administrators can review and update (e.g., using a default video player and/or editor executable on the user device). These functionalities may enable administrators to maintain compliance, transparency, and informative content, enhancing user trust and understanding of system operations.

The administrator module 130 may provide the administrator options, in a profile section, to view and update account details such as Full Name, Profile Photo, Phone, and/or Email address. The administrators may easily update their name and contact information, including the option to remove some information (e.g., uploaded photos). For Phone Number verification, administrators may receive an OTP for verification, enhancing account security. They can also resend OTPs at intervals if needed. These functionalities ensure administrators can manage and secure their profile information effectively, maintaining accurate and verified account details for platform operations.

The administrator module 130 may provide the administrator, in the manage report section, to handle reported polls. The polls may be reported by users with and/or without an explanation. The administrator may be provided with an option to search reported polls by Poll ID or Reporter, sort listings by various criteria, and filter reported polls by date for streamlined management. The administrator may be provided with an option to select individual reported polls and, in response to the selection, be displayed a detailed view providing insights into the reported poll. The detailed view may include poll ID, reporter of the poll, report date, status of the report, and provide user selectable actions (e.g., deleting or marking reports as resolved or needing further review/action). The administrator may be provided report details including status, reporter information, reason for report, and poll specifics like questions, responses, and participant percentages. Various deletion options ensure appropriate actions can be taken based on report severity, enhancing administrative oversight and response capabilities.

The system 100 may be configured to include a four-tier architecture supporting enterprise-level client-server applications, providing solutions for scalability, data security, failover, reusability, and maintainability. The four-tier architecture may include a presentation tier, application tier, data tier, and infrastructure tier.

The presentation tier may include the user interface (UI) of the poll application, where users interact with the system. The presentation tier may include the web pages or mobile app screens that display the application's features, such as creating polls, voting, and viewing poll results. The presentation tier communicates with the application tier to retrieve and display data to users.

The application tier may serve as the core logic of the poll application, handling user requests and processing business logic. The application tier may include server-side components responsible for managing user authentication, poll creation and management, vote processing, and result calculations. The application tier interacts with the data tier to retrieve and store information related to polls, users, and voting results.

The data tier stores and manages the persistent data used by the poll application. The data tier includes a relational database management system (RDBMS) such as MySQL or PostgreSQL to store information about polls, user accounts, voting records, and other application data. The data tier ensures data integrity, consistency, and security, providing reliable storage for the application's information.

The infrastructure tier may include the underlying hardware and software infrastructure to support the poll application. The infrastructure tier may include servers, networking components, and cloud services provided by a cloud based service (e.g., AWS, Google, Azure, Equinix, etc.). The infrastructure tier may help ensure the availability, scalability, and performance of the application by managing resources and handling system operations.

This four-tier architecture separates the concerns of the poll application into distinct layers, facilitating modularity, scalability, and maintainability. Each tier performs specific functions and communicates with adjacent tiers to deliver a seamless user experience while ensuring the application's reliability and performance.

Figure 2:
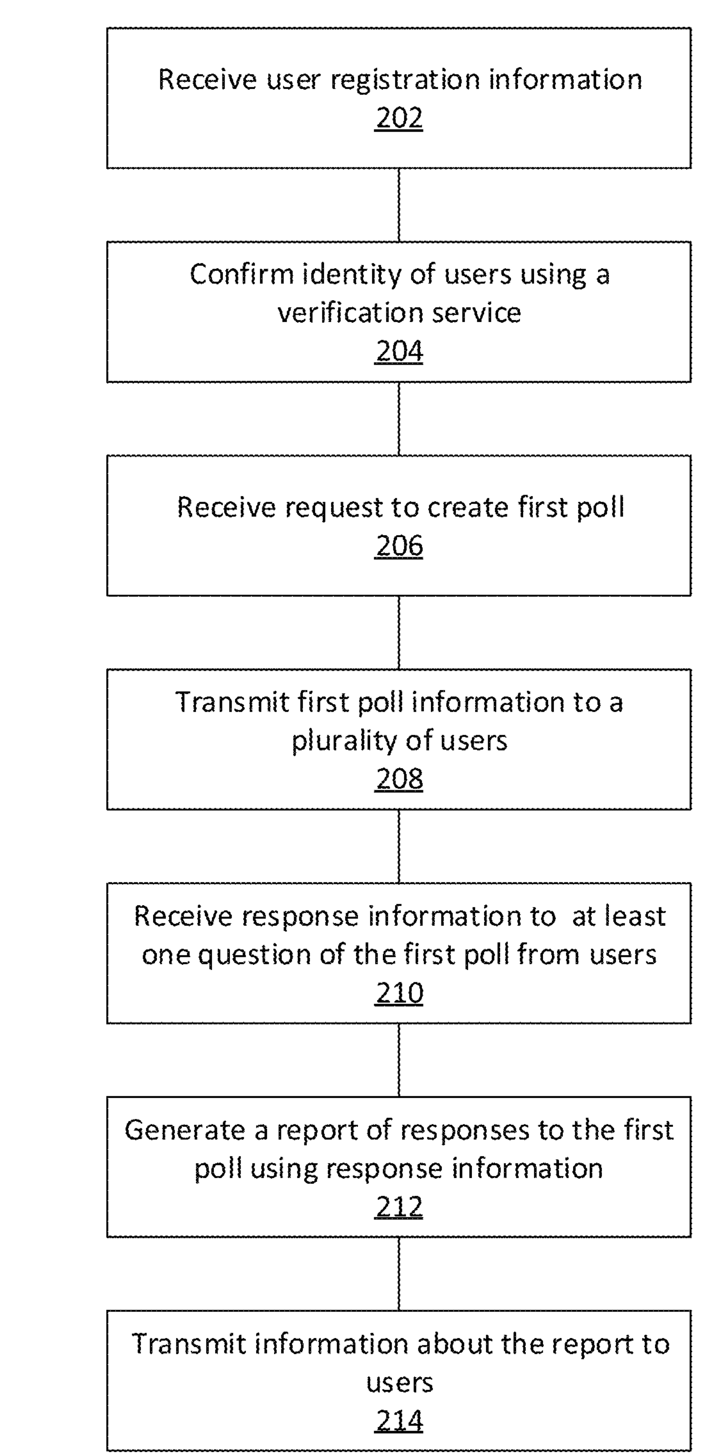
FIG. 2 is a flowchart illustrating a method for polling a population of people according to certain examples of the present technology.

FIG. 2 is a flowchart illustrating a method 200 for polling a population of people according to certain examples of the present technology. One or more operations of the method 200 may be performed by the system 100 illustrated in FIG. 1, and more specifically, one or more operations of the method 200 may be performed by the processing system 110.

The method 200 may include receiving user registration information 202, confirming identify of users using a verification service 204, receiving request to create first poll 206, transmit first poll information to a plurality of users 208, receiving response information to at least one question from users 210, generating a report of responses to the first poll using response information 212, and transmitting information about the report to the users 214.

Receiving user registration information 202 may include receiving, over the network from a plurality of user devices associated with a plurality of users, registration information for the plurality of users. The registration information may be entered by the users using a user interface displayed on the user devices. The registration information may include the user's first name, last name, phone number, user name, email address, religion, gender, date of birth, address, citizenship, country of residence, state of residence, county of residence, city of residence, and/or whether user has valid identification information (e.g., driver's license, government issued identification, social security number, and/or passport). Receiving the user registration information 202 may include performing one or more operations relating to features provided by the registration and authentication module 112.

Confirming the identity of users using a verification service 204, may include transmitting, over the network to the verification service, at least a portion of the registration information for the plurality of users, and receiving, over the network from the verification service, confirmation of identities of the plurality of users. In some examples, the registration information may be transmitted to a plurality of verification services. The verification services may include verification services provided by a government (state or federal), and/or verification services used by financial institutions and/or governments. Confirming the identity of the users may be initiated on the respective user device by the user device transmitting the registration information to the verification service and the confirmation of the user's identity may be received by the user device and transmitted to the processing system or received by the processing system from the verification service.

According to some examples, the system may be configured to validate the prospective member's identity by redirecting the applicant to a third party "Know Your Client" (KYC) identity verification service (e.g. Plaid.com), who confirms the user's identity by leveraging a combination of regulated data sources, global ID documents, and/or facial recognition. The third part verification process may include verifying identity data, confirming identity information against regulated data sources, authenticating IDs to ensure global ID documents are authentic and valid, and/or confirming liveness to ensure a person is present and their face matches the image on the provided ID.

Users whose identities are verified by the verification service may be designated as verified by the system. Upon verification, the system may store the member's name and associated demographic data in a secure database in the application. Each verified member may be guaranteed to be who they say they are and meet the demographic characteristics of the poll.

After being verified, the user may be granted access to additional features (e.g., participating in and/or creating polls) in the application. When a plurality of verification services are used to verify the identity of the user, a present number of services (e.g., two or three) may need to provide identity confirmation before the user is designated as being verified by the application. Confirming identity of users using a verification service 204 may include performing one or more operations relating to features provided by the registration and authentication module 112.

Receiving the request to create a first poll 206 may include receiving, over the network from a first user device associated with a first user among the plurality of users, a request to create a first poll. Receiving the request to create a first poll 206 may include performing one or more operations relating to features provided by the poll module 118. In some examples of the present technology, the request to create the poll may include one or more of a community, one or more poll topics, at least one question, a plurality of responses for each question, first poll expiration information, respondent age group for the first poll, respondent gender for the first poll, purpose statement for the first poll entered by the first user, indication whether to share identity of the first user with the poll, scheduled post date of the first poll, whether to display poll results to respondents, and/or respondent geographic information. In some examples, the request for the first poll may include poll report settings including indications as to who should be shown the results and when the results are shown. The poll report setting may include whether to display the poll results in real time to all users eligible to participate in the poll, whether to display the poll results only after the user has provided a response to the poll, whether to display the poll results to participants not eligible to participate in the poll, and whether to display results to all or only a portion of the questions included in the poll to the designated users.

The purpose statement for the first poll entered by the first user may include an explanation for why the poll is being conducted, information about organizations, officials and/or departments that are interested in the poll results, and/or issues related to the poll. The community of the poll may designate one or more communities to which the poll should be posted. The communities may include communities based on geographic regions (e.g., country, state, county, city, voting district, neighborhood), social club, homeowner's association, sports team or organization, religious organization, nonprofit organization, and/or social group.

The first poll expiration information may indicate when the poll is active to receive responses to one or more questions in the poll. The first poll expiration information may include a set time period (e.g., 24 hours, one week, one month), or designated hours and/or days for start and/or end of the poll. The expiration information may also include minimum participation level needed before the poll is made inactive. The minimum participation level may be included in addition to the set time period for the poll. In this example, the user may designate that the poll will expire on a specific date if the minimum participation level is satisfied and the poll will continue to be active only until the minimum participation level is satisfied after the specific date. The minimum participation level may include a specific percentage or number of all eligible users to participate in the poll or a specific demographic of users.

Transmitting the first poll information to a plurality of users 208, may include, in response to receiving the request, transmitting, over the network, information about the first poll to user devices among the plurality of user devices associated with users that belong to the community. Transmitting the information about the first poll may include providing the user device's notifications that the first poll is available for voting, and/or transmitting the poll details to the user devices. The plurality of user devices that receive the poll information may include user devices associated with users that are eligible to participate in the poll. The eligible participant in the poll may include users whose identities are verified, belong to the community associated with the poll, meet demographic information entered for the poll, and/or users who have not been designated as being inactive or ineligible to vote as the results of violating application guidelines.

Receiving response information to at least one question from users 210 may include receiving from at least a portion of the user devices among the plurality of user devices associated with the users that belong to the community, response information to at least one question included in the first poll. Receiving response information to at least one question from users 210 may include performing one or more operations relating to features provided by the poll module 118 and/or voting module 122. The responses to at least one question may be received over a time duration while the poll is active. In some examples, the poll may be designated as being active for an undefined amount of time (no expiration designated). In this example, the poll may stay active until the creator of the poll and/or another administrator closes the poll or one or more designated conditions are satisfied (e.g., minimum amount of users participate in the poll).

Generating a report of responses to the first poll using response information 212 may include generating a report of responses to the first poll based on the received response information without associating user identities of the users that belong to the community with the responses. Generating the report of responses to the first poll using response information 212 may include performing one or more operations relating to features provided by the poll module 118 and/or voting module 122. Generating the report based on the received response information and without associating user identities of the users that belong to the community with the responses may reduce the computation needs of the processing system because the system needs to process less information and less storage is needed for storing response information because user identifying information does not need to be stored for generating the report.

The report of the responses to the poll may include graphical representation of the poll results. The report may classify the responses based on a plurality of criteria including demographic information of the participants, voting time periods, and participation level of participants in other polls. In one example, the demographic information of the user is only used for identifying which polls to provide to the user and are not used or associated with any voting performed by the user. In this example, only the poll results are stored, reducing the amount of processing power and storage needed for processing and/or storing the data.

Transmitting information about the report to the users 214 may include transmitting information about the report to the user devices among the plurality of user devices associated with users that belong to the community. In some examples, the information about the report may be transmitted only to users who participated in the poll. Depending on the settings of the first poll, the information about the report may be transmitted in real time as the responses are received from the users, or may be transmitted only after participation in the first poll is closed. In one example, the creator of the poll may be able to view the results of the first poll in real time, and the participants of the poll can view the results only after participation in the poll is closed. In one example, only the creator of the poll, administrators and/or sub-administrators of the community associated with the poll, can view the results of the poll. The information about the report may include indication that participation in the poll is closed, the results of the poll are in text and/or graphical form, and/or the statistics of participation and/or participants in the poll.

What specific information about the results of the poll is revealed to the users can vary based on whether the user is the creator of the poll, participant in the poll, eligible participant who did not participate in the poll, administrator of the community associated with the poll, or sub-administrator of the community. As an example, the creator of the poll may be provided with poll results and demographic information for the poll results, while a participant of the poll may only receive results indicating the number of users who selected each response and a participant who did not participate in the poll may only be provided a number of users who participated in the poll. However, none of the reports of the poll include identifying information of the participants to maintain anonymous participation in the poll.

Figure 3:
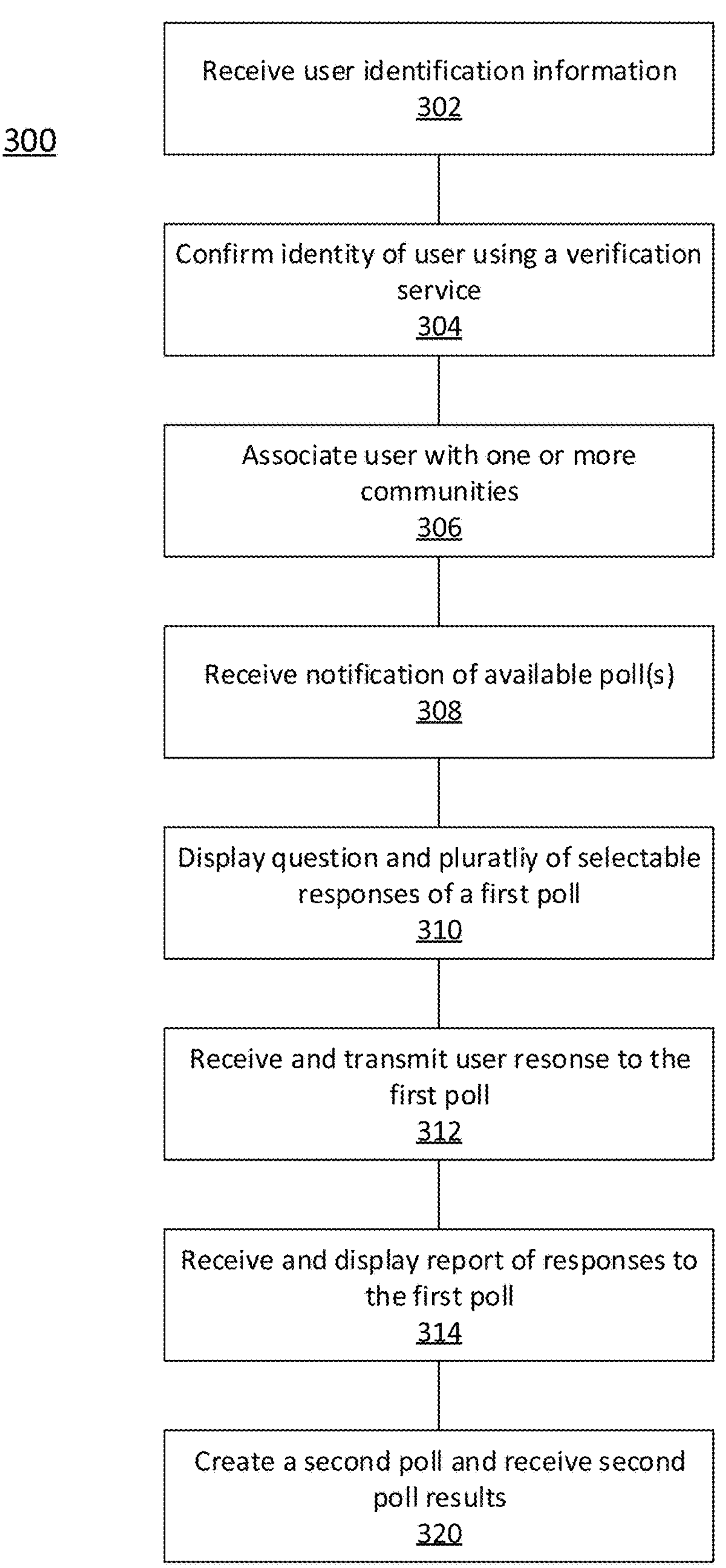
FIG. 3 is a flowchart illustrating a method for polling a population of people according to another example of the present technology.

FIG. 3 is a flowchart illustrating a method 300 for polling a population of people according to certain examples of the present technology. One or more operations of the method 300 may be performed by the system 100 illustrated in FIG. 1, and more specifically, one or more operations of the method 300 may be performed by the user devices 150*a*, 150*b*, and/or 150*c*. The user devices 150*a*, 150*b*, and/or 150*c* may include a display, a user input device (e.g., touch display or keyboard), communication circuitry configured to communicate over a network with a server, at least one processor comprising processing circuitry, and non-transitory computer readable storage medium storing instructions that, when executed by the at least one processor, cause the user device to perform one or more operations of method 300.

The method 300 may include receiving user registration information 302, confirming identity of a user using a verification service 304, associating the user with one or more communities 306, receiving notification of available poll(s) 308, displaying question(s) and plurality of selectable responses of a first poll 310, receiving and transmitting user responses to the first poll 312, and receiving and displaying report of responses to the first poll 314.

Receiving user registration information 302 may include receiving, based on user inputs made into a registration screen displayed on the display, user registration information for a user. The registration information may be entered by the users using a user interface including the registration screen displayed on the user device.

The user registration information may include the user's first name, last name, phone number, user name, email address, religion, gender, date of birth, address, citizenship, country of residence, state of residence, county of residence, city of residence, and/or whether the user has valid identification information (e.g., driver's license, government issued identification, social security number, and/or passport). Biometric data (e.g. facial recognition) may be used to verify proof of life or validate government issued identification. Receiving the user registration information 302 may include performing one or more operations relating to features provided by the registration and authentication module 112.

Confirming identity of a user using a verification service 304, may include transmitting, to the server over the network, a request to authenticate an identity of the user using a verification service. The request may include authenticating the identity of the user using at least a portion of the registration information provided by the user. Confirming identity of a user using a verification service 304 may include receiving, over the network from the verification service, confirmation of identity of the user. In some examples, the registration information may be transmitted to a plurality of verification services. The verification services may include a verification service provided by a government (state or federal), and/or verification services used by financial institutions and/or government. In one example, the verification service may include verification provided by Plaid Inc. Confirming the identity of the users may be initiated on the respective user device by the user device transmitting the registration information to the verification service and the confirmation of the user's identity may be received by the user device and transmitted to the processing system or received by the processing system from the verification service without transmitting the results of identity verification to the user device.

Users whose identities are verified by the verification service may be designated as verified by the system. After being verified the user may be granted access to additional features (e.g., participating in and/or creating polls or communities) in the application. When a plurality of verification services are used to verify the identity of the user, a present number of services (e.g., two or three) may need to provide identity confirmation before the user is designated as being verified by the application. Confirming identity of the user using a verification service may include performing one or more operations relating to features provided by the registration and authentication module 112.

Associating the user with one or more communities 306 may include, after the identity of the user is authenticated, associating, based on user inputs into a community selection screen displayed on the display, the user with one or more communities from a plurality of communities. Associating the user with one or more communities 306 may include performing one or more operations relating to features provided by the community module 124. The user may be display a screen including a plurality of topics and based on selection of the one or more topics, a list of communities to which the user is eligible to join may be displayed to the user in the user interface. The list of communities may be determined based on the registration information provided by the user. In one example, the user may create a community to which the user and other users can belong. Creating the community may include entering a community name, description, and topics associated with the community. The user interface may provide the user with a function to invite members to the created community.

The associating of the user with the one or more communities and/or changes to the associated community may be performed manually and/or automatically. The associating of the user with the one or more communities may be performed based on their demographic information, interests, and/or recommendations of other users (e.g., other users of communities to which the user is a member and/or administrator of another community). In one example, when a predetermined number of users of one community recommend another user, the user may be associated automatically with the community. In one example, at least one or more of the recommendations may need to be from an administrator.

In some examples, one or more users of a community may be removed from one or more communities, added to one or more communities, and/or moved to one or more other communities. A user may be automatically removed from a community when the user information of the user no longer meets the parameters of the community. As an example, a user may be removed from one community and/or moved to another community based in changes in age, marital status, eligibility to work, occupation, number of children and/or children's demographic, work location, residency, physical possessions (e.g., house, vehicle, electronic devices), and/or citizenship. In one example, when a user changes their residency, the user may be removed from a community associated with the original residency and/or moved to another community associated with a new residency of the user. In another example, a user may be removed from a community associated with an age group to which the user no longer belongs and/or moved to another community associated with an age group to which the user now belongs.

In some examples, the parameters of a community to which members belong may be adjusted over time. In one example, if a user belongs to a community associated with an age group of 18-25, the community age group may be adjusted with time so that the age group associated with the group may be applicable to the members of the community. In this example, the users of the community continue to remain with the same group as the members grow older and new members that belong to the same updated age group may join the community.

Receiving notification of available poll(s) 308 may include receiving a notification indicating availability of one or more polls associated with the one or more communities associated with the user. Receiving notification of available poll(s) 308 may include performing one or more operations relating to features provided by the notification module 116. The available polls may be displayed on the display of the user device based on the time of creation of the poll, expiration of the poll, or priority of the polls set by the system or a creator of the poll.

Displaying question and plurality of selectable responses of a first poll 310 may include, in response to the user selecting a first poll among the one or more polls associated with the one or more communities associated with the user, simultaneously displaying a question and a plurality of selectable responses of the first poll on the display of the user device. Displaying question(s) and plurality of selectable responses of a first poll 310 may include performing one or more operations relating to features provided by the voting module 122.

Receiving and transmitting user responses to the first poll 312 may include receiving a user input selecting at least one of the displayed plurality of selectable responses of the first poll, and in response to receiving the user input, selecting the at least one response, transmitting, to the server over the network, information indicating the selected at least one response. Receiving and transmitting user response to the first poll 312 may include performing one or more operations relating to features provided by the voting module 122.

Receiving and displaying report of responses to the first poll 314 may include, after transmitting the information indicating the selected at least one response, receiving, from the server over the network, a report of responses to the first poll received from a plurality of users, and displaying, on the display, the report of the responses to the first poll. Receiving and displaying report of responses to the first poll 314 may include performing one or more operations relating to features provided by the voting module 122. The report of responses may be generated without associating user identities of the plurality of users.

The method 300 may also include creating a second poll and receiving poll results 320. Creating the second poll and receiving poll results 320 may include performing one or more operations relating to features provided by the poll module 118 and/or the voting module 122. Creating the second poll and receiving poll results 320 may include receiving, based on user inputs into a poll creation screen displayed on the display, a request to create a second poll, in response to receiving the request to create the second poll, transmitting, to the server over the network, information about the request for the second poll, receiving, from the server over the network, a report of responses to the second poll received from a plurality of users that belong to the second poll community, and displaying, on the display, the report of the responses to the second poll. The report of responses to the second poll may be generated without associating user identities of the plurality of users that belong to the second poll community.

In some examples of the present technology, the request to create the second poll may include a user input entered into a poll creation screen identifying one or more of a community, one or more poll topics, at least one question, a plurality of responses for each question, first poll expiration information, respondent age group for the second poll, respondent gender for the second poll, purpose statement for the first poll entered by the first user, indication whether to share identity of the first user with the poll, scheduled post date of the second poll, whether to display poll results to respondents, and/or respondent geographic information. The respondent geographic information may be used for targeting polls to users belonging to the geographic region while protecting the region (e.g., country, state, county, city, community) from outside influence. In some examples, the user may enter poll report settings, including indications as to who should be shown the results and when the results of the second poll are shown. The poll report settings may include whether to display the poll results in real time to all users eligible to participate in the poll, whether to display the poll results only after the user has provided a response to the poll, whether to display the poll results to participants not eligible to participate in the poll, and whether to display results to all or only a portion of the questions included in the poll to the designated users.

The purpose statement for the second poll entered by the user may include an explanation for why the poll is being conducted, information about organizations, officials and/or departments that are interested in the poll results, and/or issues related to the poll. The community of the poll may designate one or more communities to which the poll should be posted. The communities may include communities based on geographic regions (e.g., country, state, county, city, voting district, neighborhood), social club, homeowners association, sports team or organization, political party, corporation, religious organization, nonprofit organization, and/or social group.

The second poll expiration information may indicate when the poll is active to receive responses to the one or more questions in the poll. The second poll expiration information may include a set time period (e.g., 24 hours, one week, one month), or designated hours and/or days for start and/or end of the poll. The expiration information may also include a minimum participation level needed before the poll is made inactive. The minimum participation level may be included in addition to the set time period for the poll. In this example, the user may designate that the poll will expire on a specific date if the minimum participation level is satisfied and the poll will continue to be active only until the minimum participation level is satisfied after the specific date. The minimum participation level may include a specific percentage or number of all eligible users to participate in the poll or a specific demographic of users.

In some examples of the present technology, the system may provide multilevel security by implementing security for providing functionalities to the user and security for transmitting information between the user device and the server (e.g., cloud system). Token based approach may be used for authenticating the user and granting access to specific resources and/or functionalities. Encrypted communication between the user and a server may be used to protect data during transmission. Another level of security is provided by the system keeping track that a user voted but not keeping track of how users vote in the polls at all levels.

In some examples, an authentication operation may be performed when a user signs into the application. The system may issue an access/ID token including the user's identity claims. The backend of the system 100 may validate the token with each request to confirm the user's credentials. After verification of the token, the user's role (e.g., stored in an application database) may be checked to determine what resources and actions the user is permitted to access. The resources and actions the user is permitted to access may be determined based on the type of user type associated with the user.

The user without administrative or sub-administrative access may be provided with one or more functionalities including: account management, feeds and polls, community, profile, and/or notifications. The account management functionality may provide registration and log in with credentials. The feed and polls functionality may provide access to feeds, and function to create and vote in polls. The community functionality may provide functions to create, edit or delete communities. The profile functionality may provide functions to manage profile setting and preferences. The notification functionality may provide functions to receive system and activity notifications.

The administrative user may be provided with one or more functionalities including: full access to all modules, user management to manage accounts and permissions, category management for approving and declining user category requests, poll management for reviewing and moderating reported polls, content moderation for monitoring and controlling content and/or interactions, dashboard for accessing system usage analytics, and/or system settings for configuring system preferences.

The sub-administrator user may be provided with role-based access providing access to all administrator modules except sub-admin management. The sub-administrator user may be provided with one or more permissions (e.g., read, view, edit, delete) delegated to the sub-administrator user by the administrator. The sub-administrator user functionality may include module control functionality for moderating content, managing communities, and/or assisting in user/account tasks. In some examples, the sub-administrative user may not be provided with options to manage other sub-administrator users.

FIGS. 4A-6 illustrate example user interface screens that may be displayed on the user devices 150*a*, 150*b*, 150*c*. The features provided in the illustrated screen may be provided by one or more modules illustrated in FIG. 1.

FIG. 4A illustrates a profile screen including plurality entries for registration information that may be entered by the user according to an example of the present technology. The registration information may be used for verification of the user's identity using a third party verification service. As shown in FIG. 4A, the registration information may include first name, last name, phone number, user name, email address, religion, gender, date of birth, address, citizenship, residence, and identification number (e.g., social security number). In some examples, the registration information may include a user picture which may or may not be used by the third party verification service for confirming proof of life or the identity of the user.

One or more of the plurality of entries may not be used for verifying the user's identity. In some examples, one or more of the plurality of entries may be locked from further edits after the identity of the user is verified by the third party verification service. In the example illustrated in FIG. 4A, only the religion field may be editable. In one example, if the registration information that is verified by the third party verification service is requested to be modified, the verification service is repeated to confirm the identity of the user. In some examples, the identity of the user may be periodically re-verified to confirm that the identity of the user is valid (e.g., that the user has not changed name or residency, or is if the user is deceased).

Figure 4B:
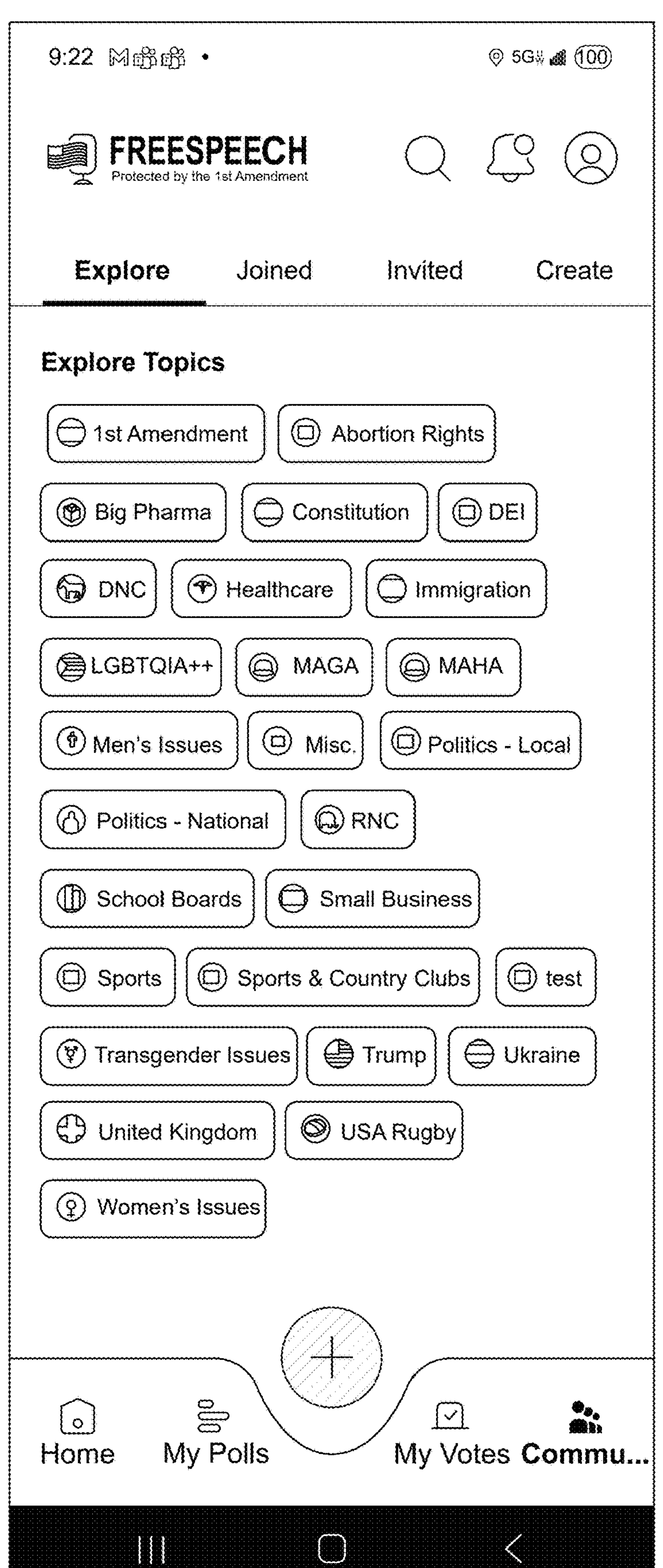
FIG. 4B illustrates a screen providing a user an option to explore communities that the user can join with or without approval from the system and/or an administrator of the community according to an example of the present technology.

FIG. 4B illustrates a screen providing a user an option to explore communities that the user can join with or without approval from the system and/or an administrator of the community according to an example of the present technology. The user may explore the communities by selecting one or more topics that are associated with the communities. In response to selecting one of the topics, a screen with communities that are associated with the selected topic may be displayed on the screen. As shown in FIG. 4B, the screen may include an option to explore communities based on topics, an option to display joined communities, an option to display communities to which the user is invited, and an option to create a new community.

Figure 4C:
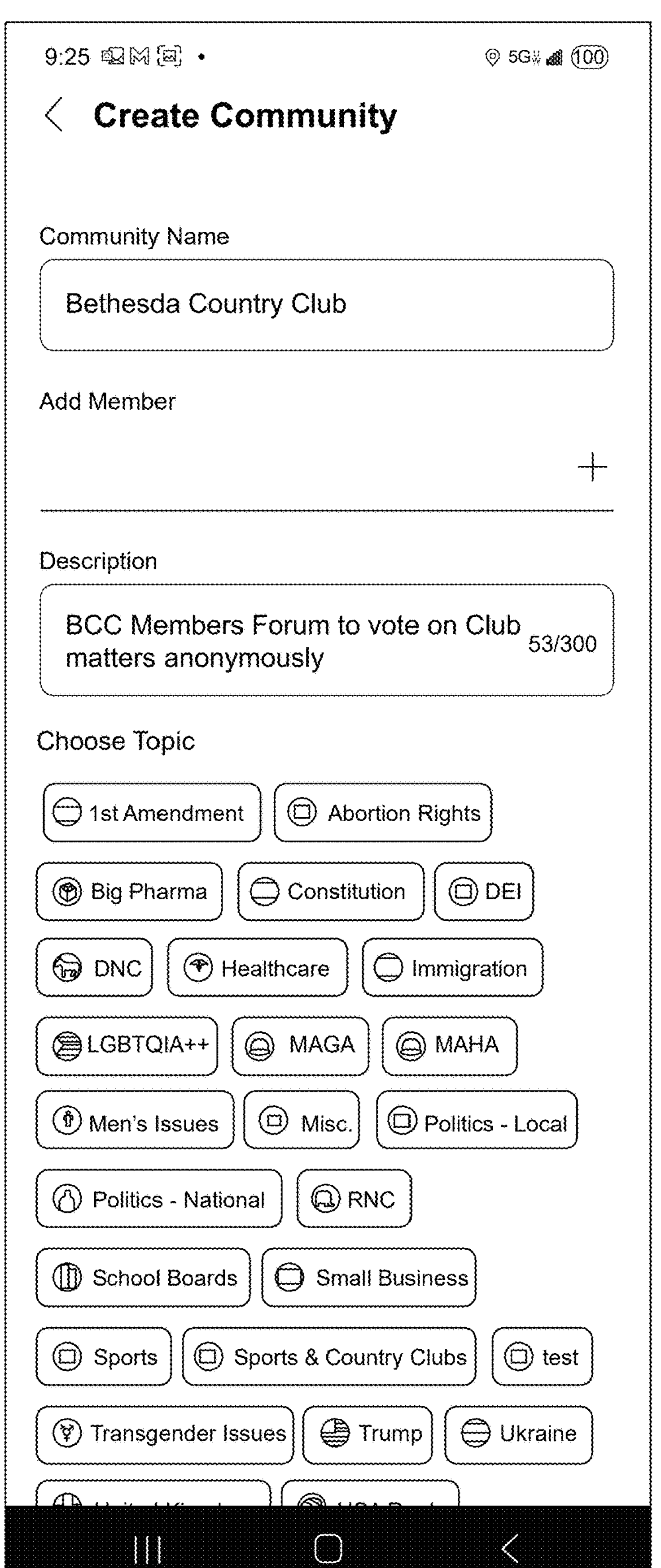
FIG. 4C illustrates a screen for creating a new community according to an example of the present technology.

FIG. 4C illustrates a screen for creating a new community according to an example of the present technology. The request for creating a new community may include entering a name of the community, a description of the community, and/or one or more topics that are associated with the community. The one or more topics of the community may be used to recommend the community to other users. The screen for creating the new community includes an Add New Member option to send invitations or add members of the community by the creator of the community. According to some examples, the creator of the community may be an administrator of the community with options to receive insight into the community and polls requested and completed in the community that are not provided to other members of the community.

Figure 4D:
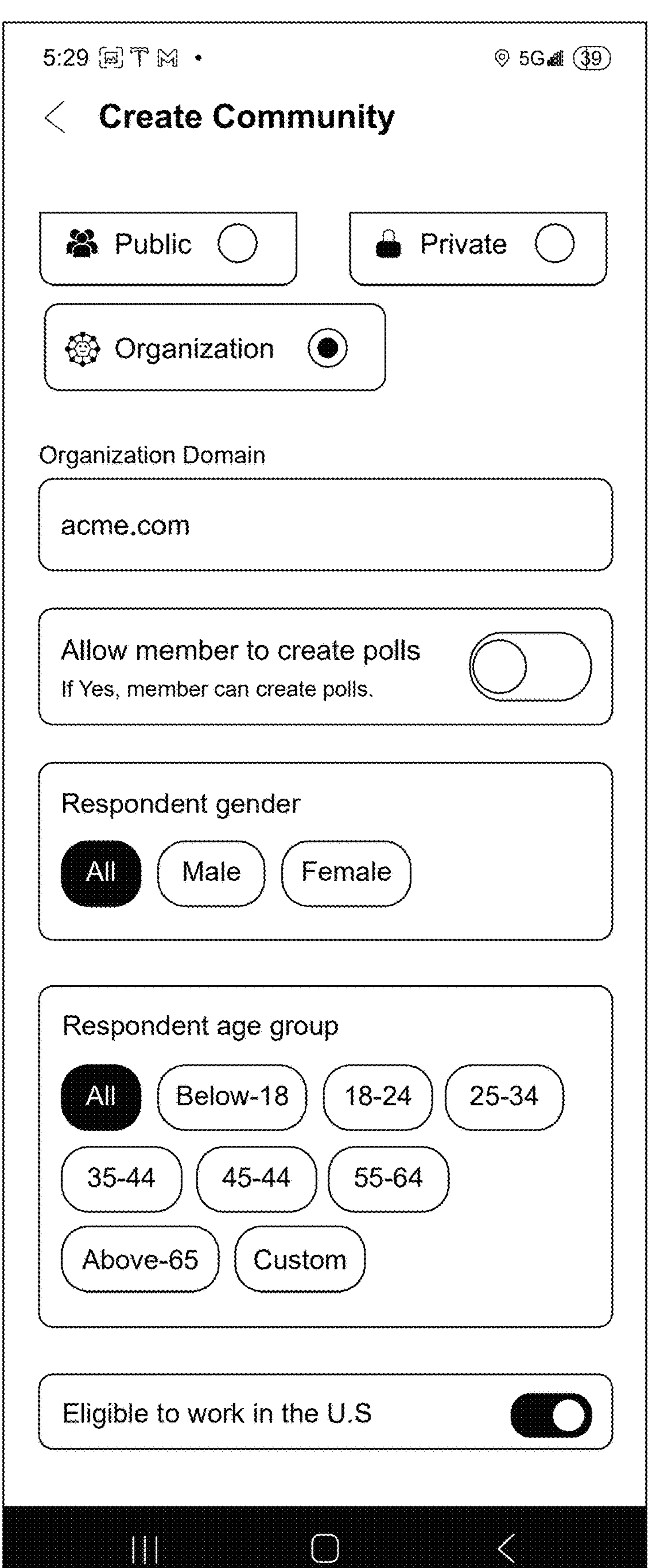
FIG. 4D illustrates another screen for creating a new community according to an example of the present technology.

FIG. 4D illustrates another screen for creating a new community according to an example of the present technology. The screen may include an option for the user to select between the community being a public community, a private community, or an organization. The public community may include a community that is searchable by users of the platform. The users that can search for a public community may include user satisfying one or more criteria (e.g. geographic, gender, age etc.). The private community may include a community which is not publicly searchable. The private community may allow the creator of the community to invite users to join the community and/or allow other members to invite users to join the community. An organization community may include a political organization, social organization, religious organization, a company, or a homeowner's association, or users living in a specified community. Organization information, such as organization domain, contact information, and/or description, may be entered on the screen.

As illustrate din FIG. 4D, the user interface may allow community admins to either allow or not allow (toggle on/off) members to create polls. In some examples, the settings for the new community, setting may be specified for who can create polls. In one example, only the creator (administrator and/or sub-administrators) may be provided with an option to create polls. In another example, all members may be allowed to create a poll. In another example, the creator of the community may give authorization for a member to create a specified number of polls. In some examples, the creation of the poll may be given to members meeting specific criteria (e.g., being a member of community for a predetermined period of time, participating in a preset number of polls, having a specific roll in the organization, and/or satisfying specific demographic criteria) The settings for the new community may include setting respondent criteria including one or more of the respondent gender, age and/or eligibility to work. In some examples, the community setting may allow for the ability to post polls to be changed after the community is created. The creator of the community may initially set for members to not have ability to post polls and later allow the users to post polls. In some examples, the creator of the community can set time periods for when all members or certain member meeting specific criteria can post polls, and/or when all members or certain member cannot post polls.

Figure 4E:
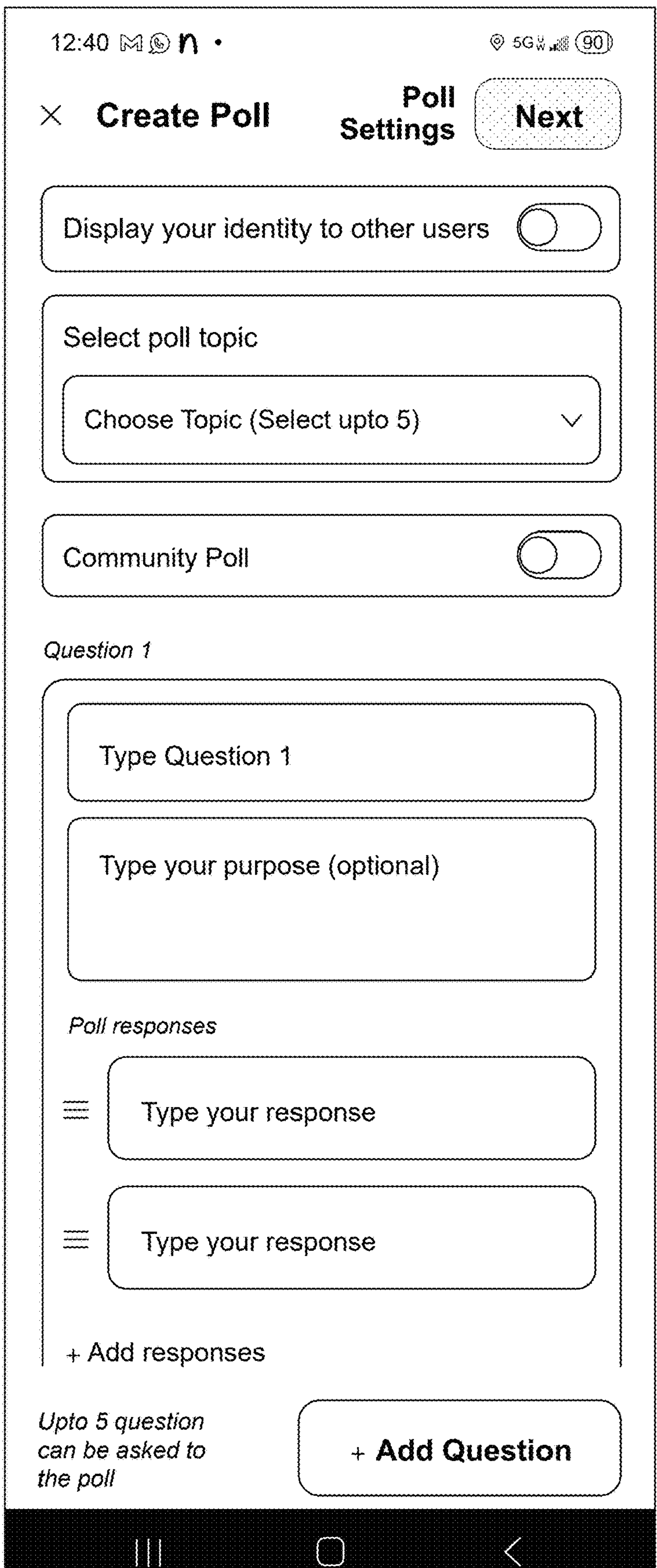
FIG. 4E illustrates a screen for creating a new poll according to an example of the present technology.

FIG. 4E illustrates a screen for creating a new poll according to an example of the present technology. The screen for creating the new poll may include an option to select whether the identity of the creator of the poll is displayed with the poll. If the option is selected to not display the user identity of the creator of the poll, the poll may be posted anonymously. The screen for creating the new poll may include options to select topics for the poll, options to select whether the poll is posted to a community, one or more questions, and a plurality of responses for each question. The number of topics that can be associated with the poll may be limited to a predefined number (e.g., 5) to promote only the most relevant topics being associated with the poll. The number of questions that the user can post to a poll may be limited to a predefined number (e.g., 5) to promote the most relevant questions being asked and to prevent including polls that are lengthy and take a significant amount of time to complete. In some examples, the number of polls that a user can post may be varied based on the user's activity level and/or membership duration. For example, after joining a community, a user may be limited to posting a single poll for the community in a predetermined time period (e.g., one poll per week), and based on the previous poll being completed, the number of polls that the user can post in the predetermined time period may be increased. The number of polls that a user can post may be reduced or blocked based on previously created polls being flagged for review. In some examples, users that post polls with engagement exceeding a set engagement threshold (e.g., number of users or percentage of community) may be granted to post a number of polls that exceeds a default value.

Figure 4F:
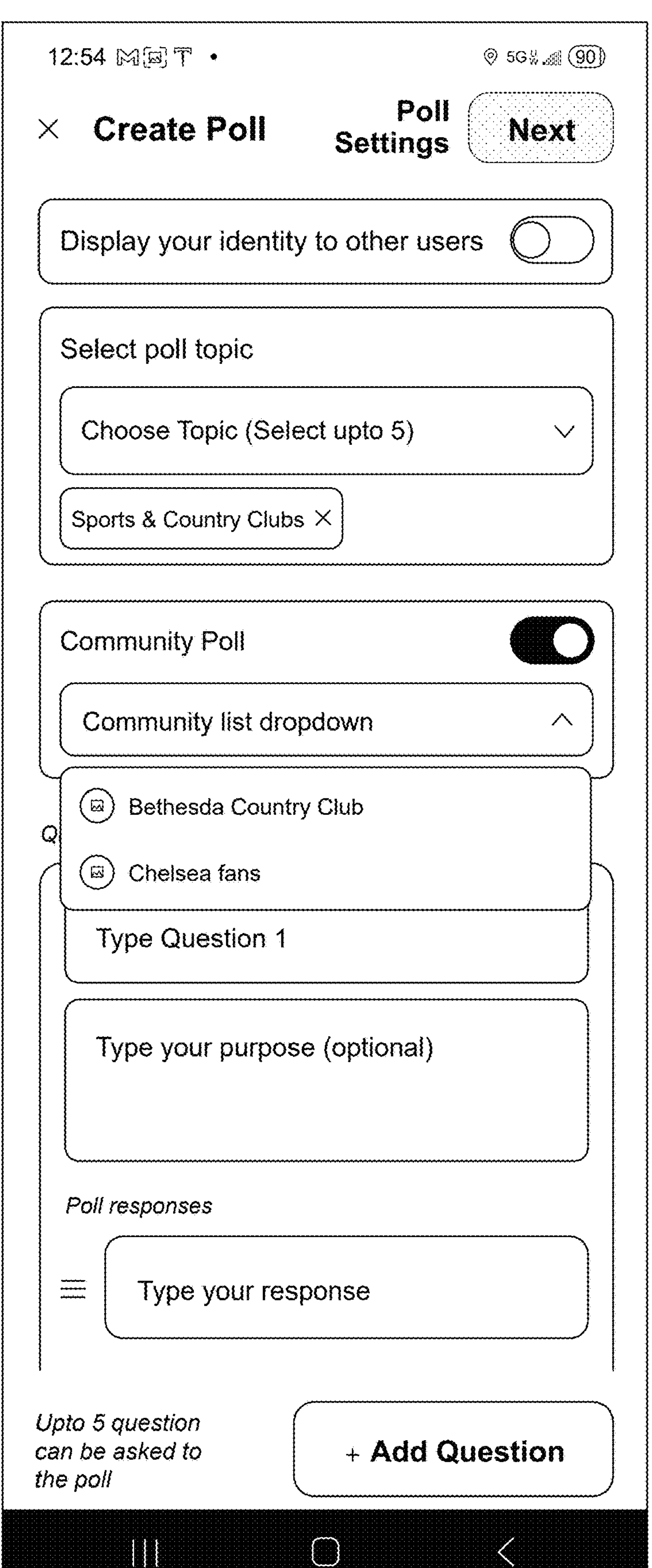
FIG. 4F illustrates another example of a screen for creating a new poll according to an example of the present technology.

FIG. 4F illustrates another example of a screen for creating a new poll according to an example of the present technology. In the example illustrated in FIG. 4F, the user may select to post the poll to a community. In response to the selection, the user may be provided with an option to post the poll to one of the communities to which the user belongs.

Figure 4G:
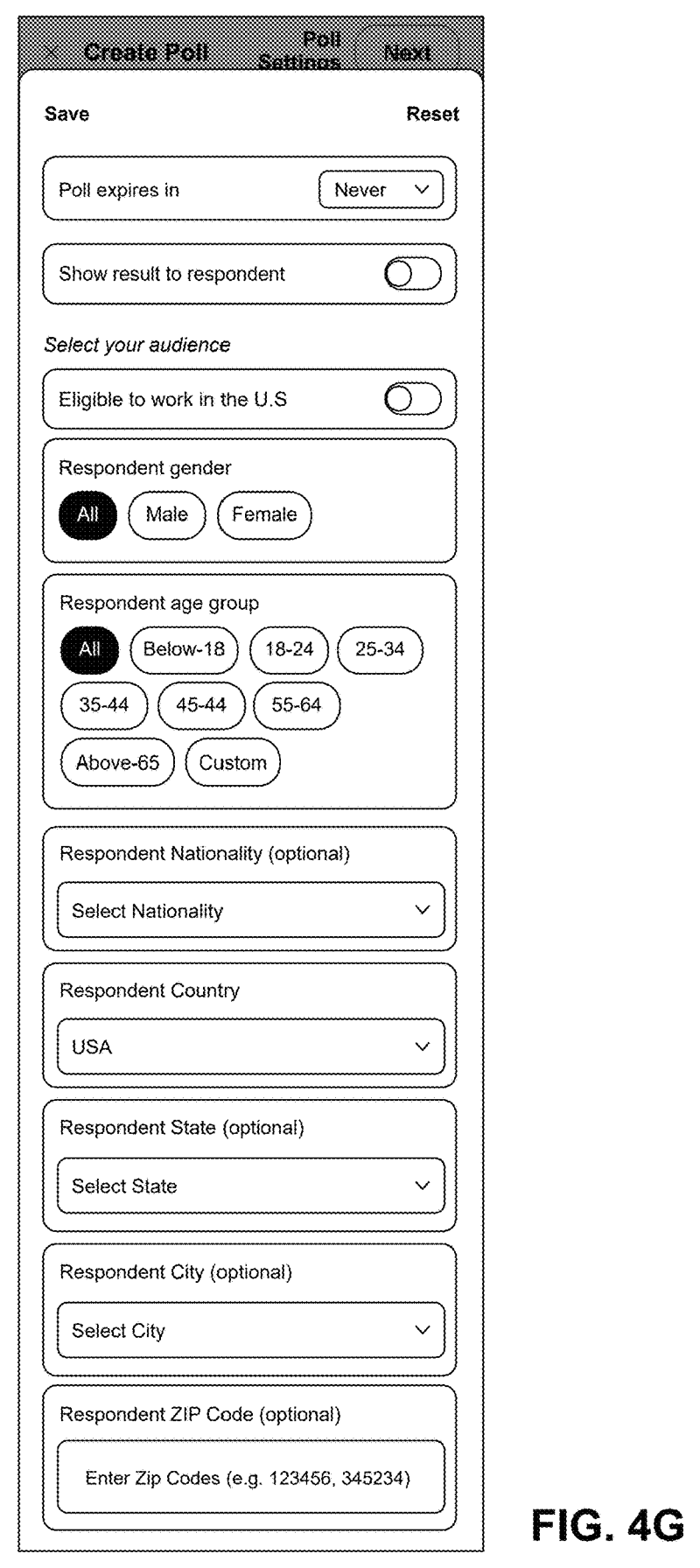

FIG. 4G illustrates a poll setting screen that may be displayed in response to selecting poll setting options illustrated in FIGS. 4E and 4F, according to an example of the present technology. The poll settings screen may include setting poll expiration, whether to show results to responders, whether the participants in the poll should be designated as being eligible to work in the country, gender of participants, respondent age group of participants, respondent nationality, and/or respondent region (e.g., country, county, state, city, and/or zip code). In one example, the default setting for the poll setting may be displayed (e.g., as shown in FIG. 4G) and the user may make changes to the default values based on the participants the user wants to participate in the poll. When the selection is made to one or more settings in the poll setting options, the user interface may display additional further defining selectable settings related to the selected settings. As an example, when the show results to responders is selected, the user interface may display an option to show the results to the users after they participate in the poll (e.g., show real-time results) or after the poll is closed. In some examples, the settings may include how the results are shown.

FIG. 4H illustrates a poll posting confirmation screen for a created poll according to an example of the present technology. The poll posting confirmation screen may display the question(s), responses, current settings for the poll, option to edit the poll, and option to post the poll.

FIG. 4I illustrates another example of a screen for creating a new poll according to an example of the present technology. In the example illustrated in FIG. 4I, the option to share the user identity with other users is selected. In response to the selection, the user is provided an option to share the user's real name or user name.

Figure 4J:
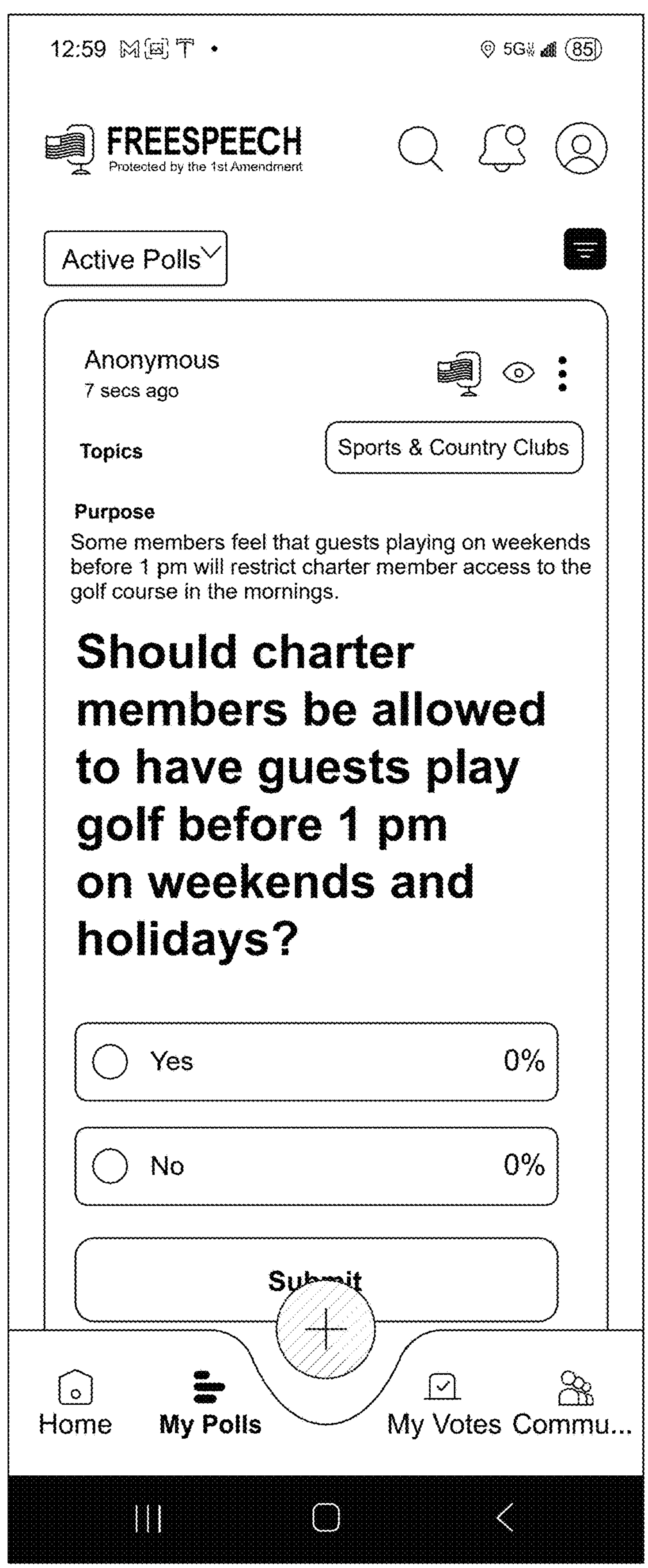
FIG. 4J illustrates a poll posting confirmation screen for a created poll according to another example of the present technology.
Figure 4K:
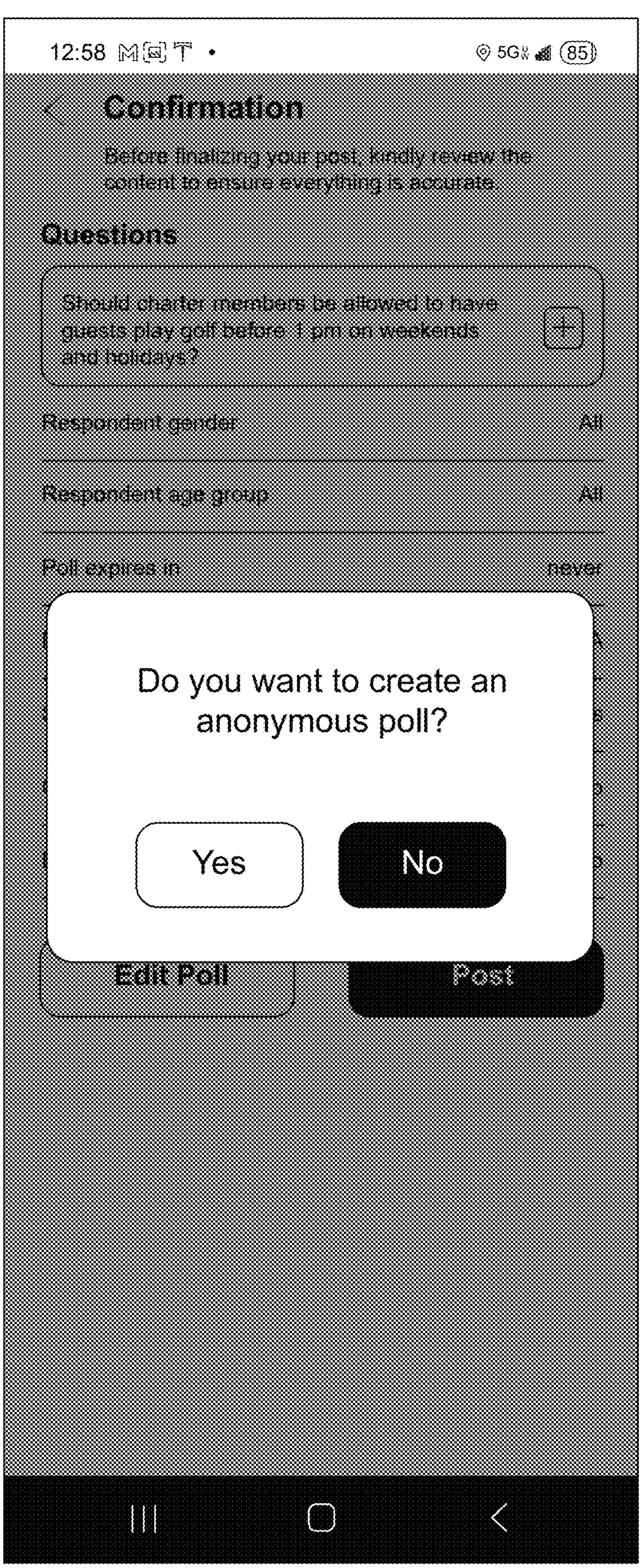
FIG. 4K displays an additional confirmation screen for posting an anonymous poll according to another example of the present technology.

FIG. 4J illustrates a poll posting confirmation screen for a created poll according to another example of the present technology. The poll posting confirmation screen illustrated in FIG. 4I correspond to a poll that is being posted anonymously. The poll posting confirmation screen may display the question(s), responses, current settings for the poll, option to edit the poll, and option to post the poll. FIG. 4K displays an additional confirmation screen for posting an anonymous poll.

Creating polls and participating in polls according to examples of the present technology provide user with bi-directional real-time interaction between users making real-world decisions and users that those decisions affect. Because the polls can be created by those making decisions, they can get live, real time feedback from the community they represent before making a decision (e.g., voting in a proposed amendment). Similarly, individuals who may be affected by the decision that will be made can create polls to give the person making the decision insight into how the community they represent feels about a particular topic.

As an example, an elected official or a person running for office, who may or not be an administrator of a community, may create a poll to ask or confirm how the people of their community feel about a topic the elected official will be voting on or the person running for office will be debating. Creating the polls may provide the elected official or the person running for office confirmations of actions they should take (a live, real time referendum). The constituent creating the polls may also show the elected official or the person running for office how they should vote to correctly represent their views and needs.

Figure 5A:
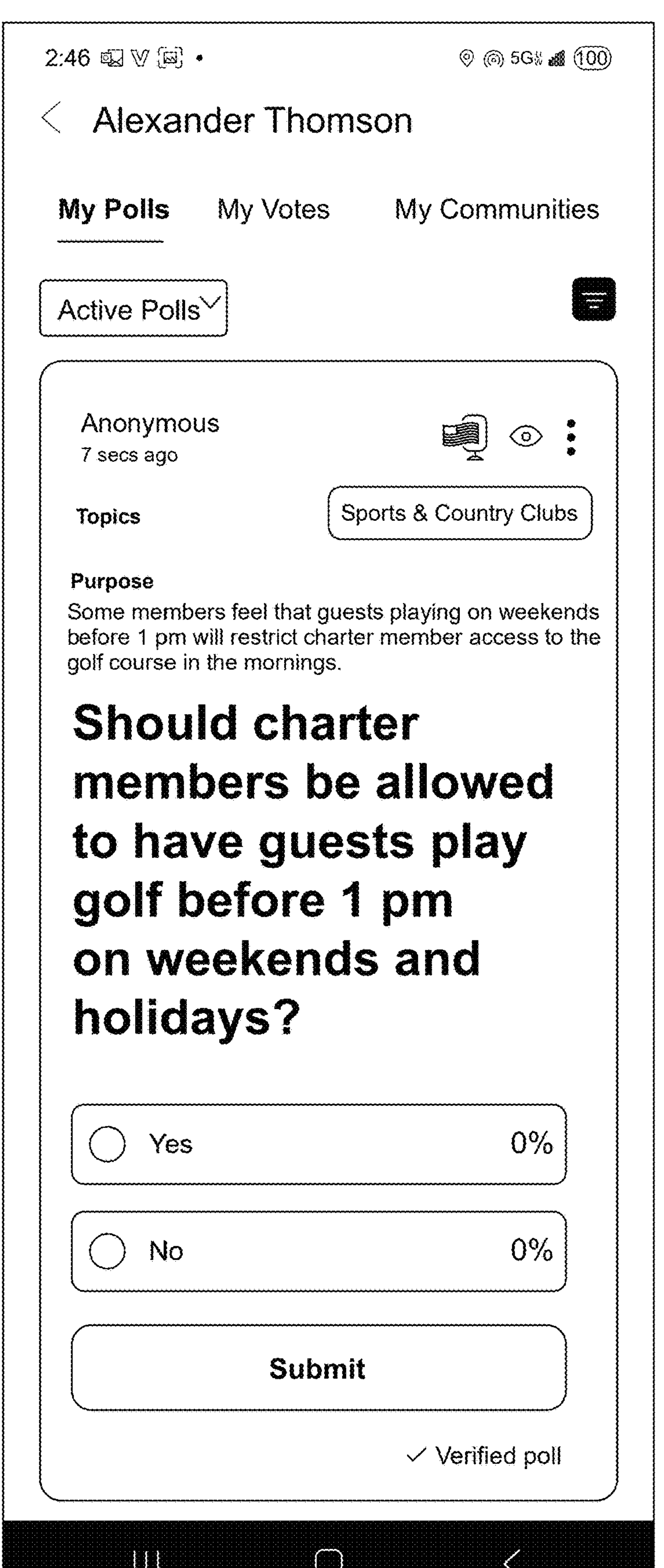
FIG. 5A illustrates my poll list screen according to an example of the present technology.

FIG. 5A illustrates My Poll list screen according to an example of the present technology. FIG. 5A illustrates a single poll available for the user to participate in being displayed. In some examples, the My Poll list screen may include a plurality of available polls that are sorted based on poll priority, creation date, or expiration date. The user may vote in a plurality of available polls directly from the poll list screen.

Figure 5B:
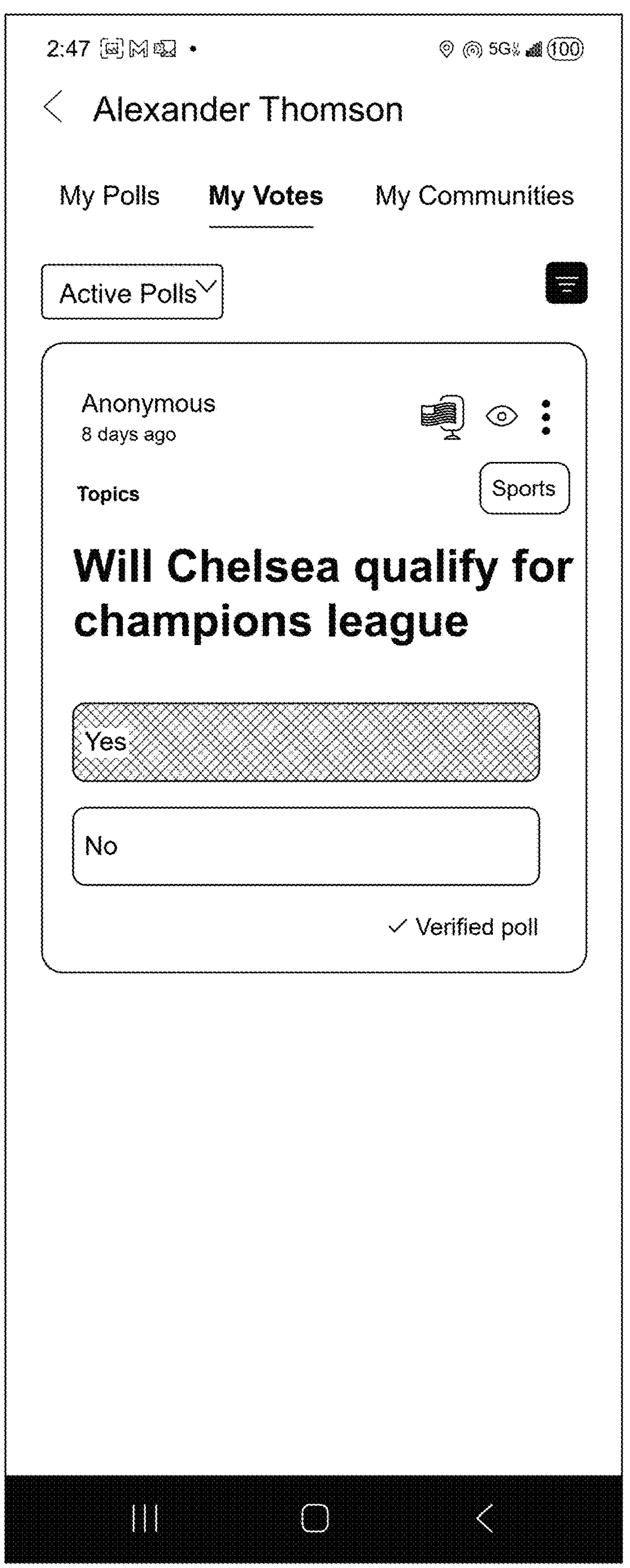
FIG. 5B illustrates my vote list screen according to an example of the present technology.

FIG. 5B illustrates My Vote list screen according to an example of the present technology. The vote list screen may display one or more polls the user has provided a response. The vote list screen may be filtered based on closed polls or active polls. The vote list screen may display the poll question, the plurality of response to the poll question, and a response provided by the user. In some examples, the user may be provided with an option to modify provided responses to a poll for active polls.

Figure 5C:
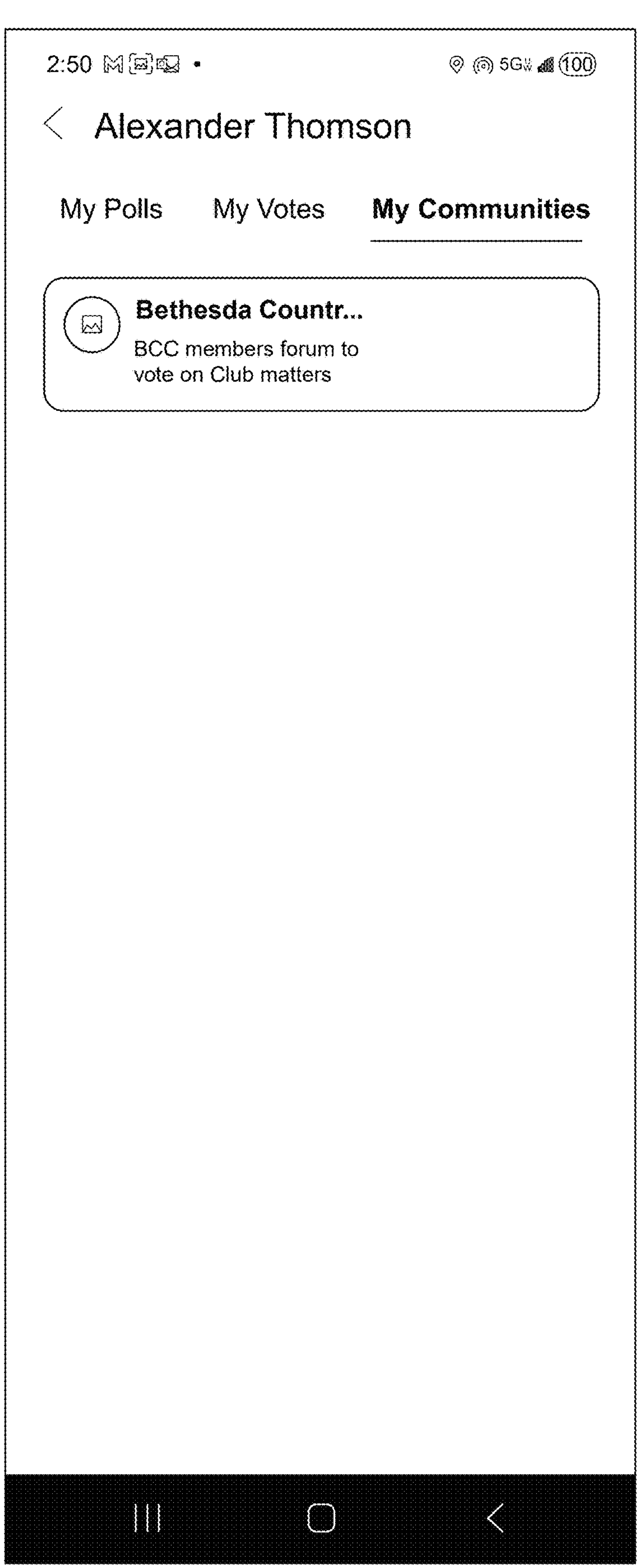
FIG. 5C illustrates my communities list screen according to an example of the present technology.

FIG. 5C illustrates My Communities list screen according to an example of the present technology. The communities list screen may display communities to which the user belongs. The list may include one or more communities in which the membership of the user is pending. The communities in the communities list screen may be sorted based on the community name, total activity level in the community, or user activity level in the community.

Figure 5D:
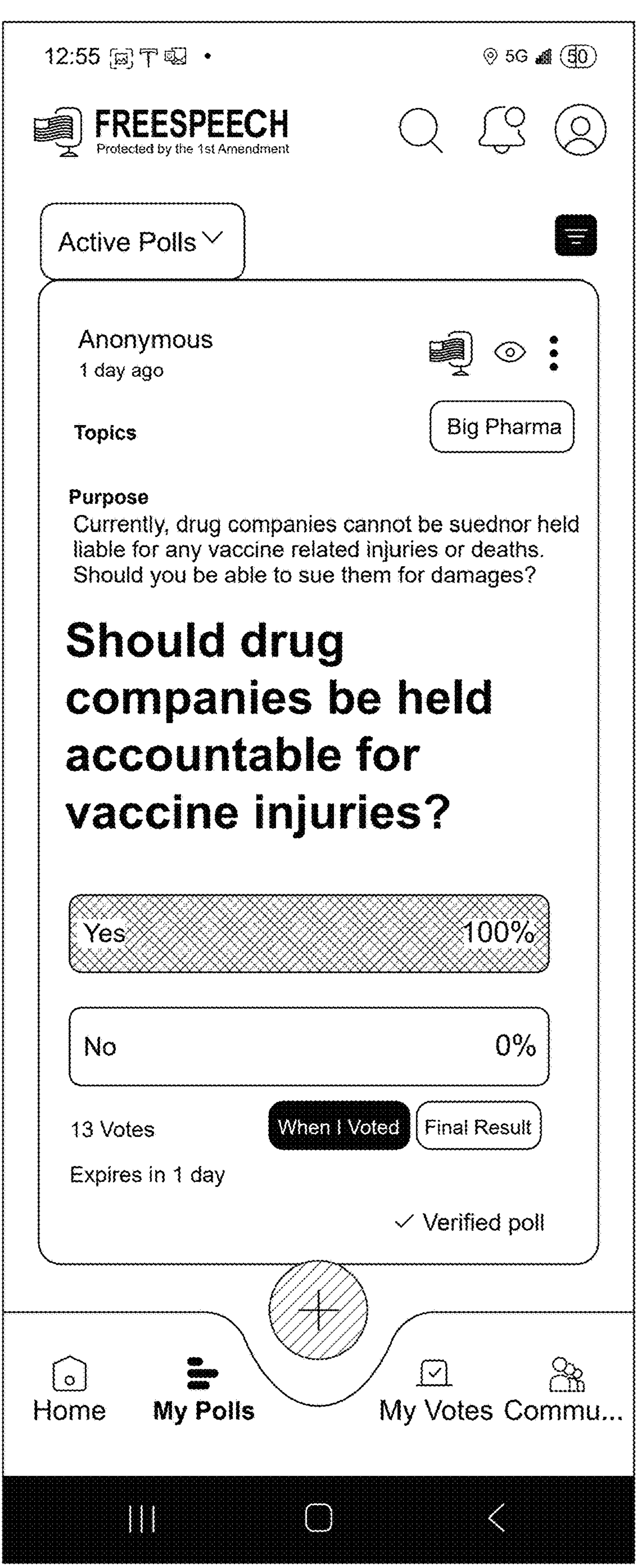
FIG. 5D illustrates a report page according to examples of the present technology.
Figure 5E:
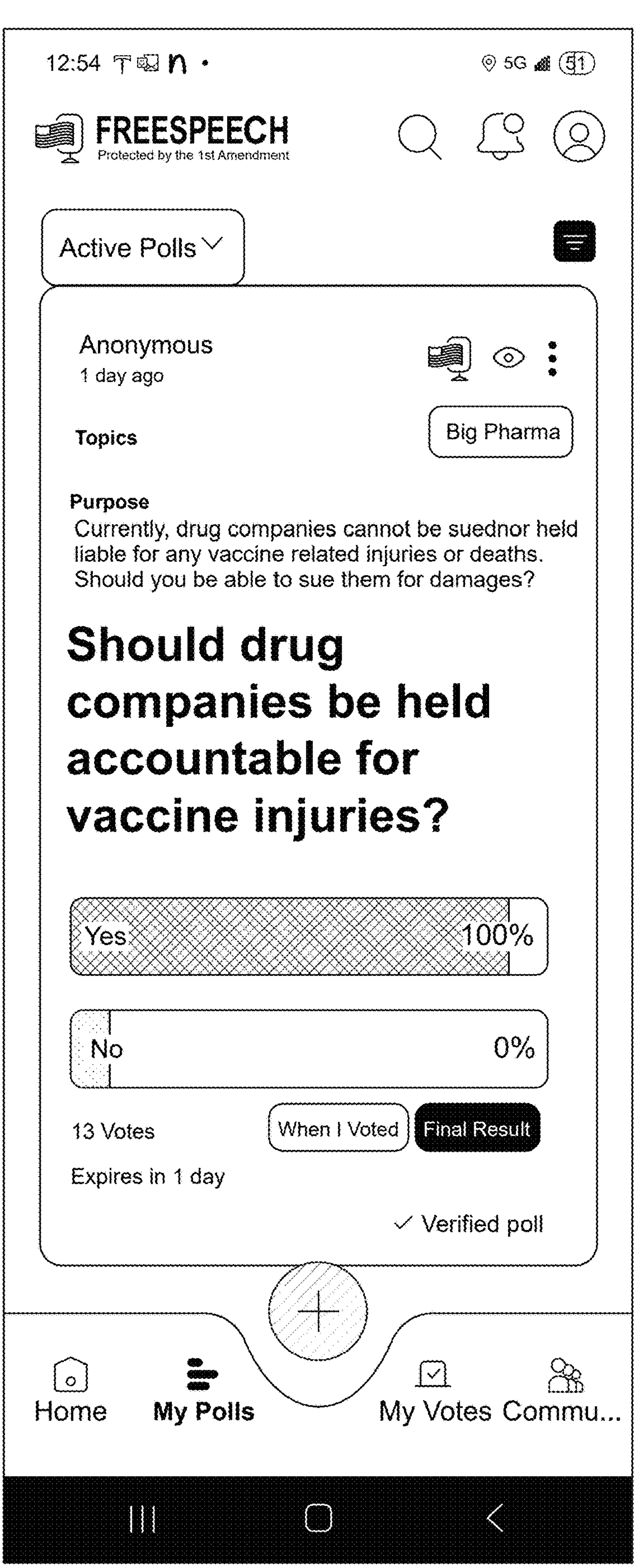
FIG. 5E illustrates another report page according to examples of the present technology.

FIGS. 5D and 5E illustrate a report page according to examples of the present technology. The report page may display a current result of the poll in which the user has participated. In some examples, the poll report may display the results of the poll when the user participated (e.g., FIG. 5D), or the current or final results (e.g., FIG. 5E). The report page may display the total number of votes and expiration information for the poll. In some examples of the present technology, the report page may include the results in graph form.

The report page includes a user selected icon to share the report page on a social platform, text, email, twitter, and/or a short video sharing platform. In some examples, the processing system 110 may be configured to automatically generate a short video with or without voice and/or music introducing information about the poll (e.g., poll purpose, poll question(s), and responses) and results of the poll for sharing with other users inside or outside of the application.

According to some examples of the present technology, the results of the poll can be published in the application or other social and/or media platforms live or at specific deadlines (e.g., expiration of the poll).

According to some examples of the present technology, the system may be configured to leverage semantic analysis to extract deep insights from the collected responses. By applying natural language processing (NLP) techniques, sentiment analysis, and contextual understanding, the platform can generate valuable interpretations for any given parameter—be it customer satisfaction, political leanings, or emerging trends. This would allow businesses, policymakers, and researchers to gain an informed perspective rather than just numbers. Additionally, providing AI-driven recommendations based on these findings could further enhance decision-making capabilities, positioning the processing system as not just a data repository of poll results but an intelligence-driven advisory tool.

Figure 6A:
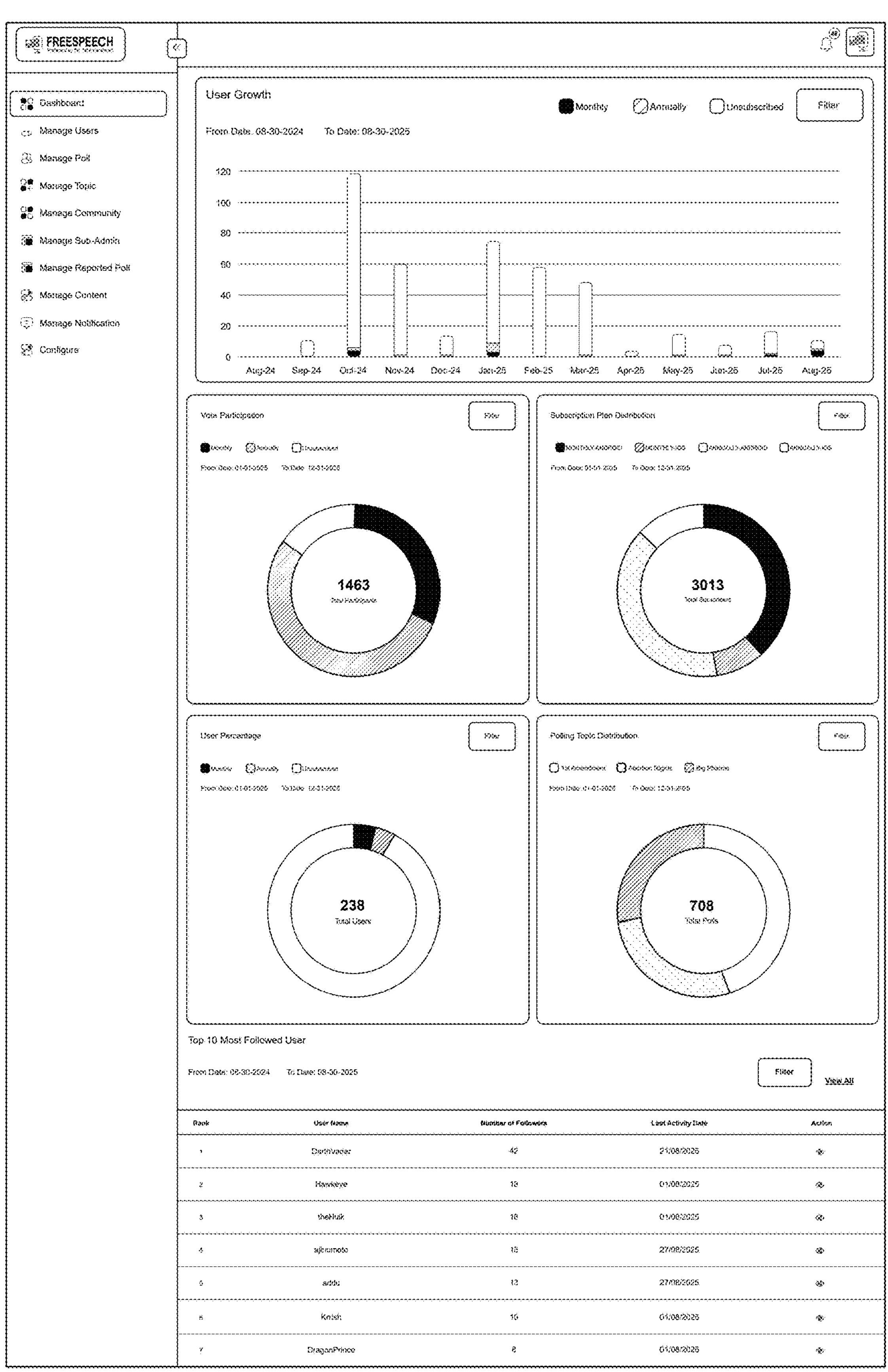
FIG. 6A illustrates an administrator dashboard according to an example of the present technology.

FIG. 6A illustrates an administrator dashboard according to an example of the present technology. As illustrated in FIG. 6A, the administrator dashboard provides a growth diagram, vote participation diagram, subscription plan distribution diagram, user percentages by category diagram, polling topic distribution diagram, and a list of most followed users. Administrator dashboard can be customized to remove and add diagrams and/or lists displayed and to customize the ranges and parameters of each diagram and/or list.

Figure 6B:
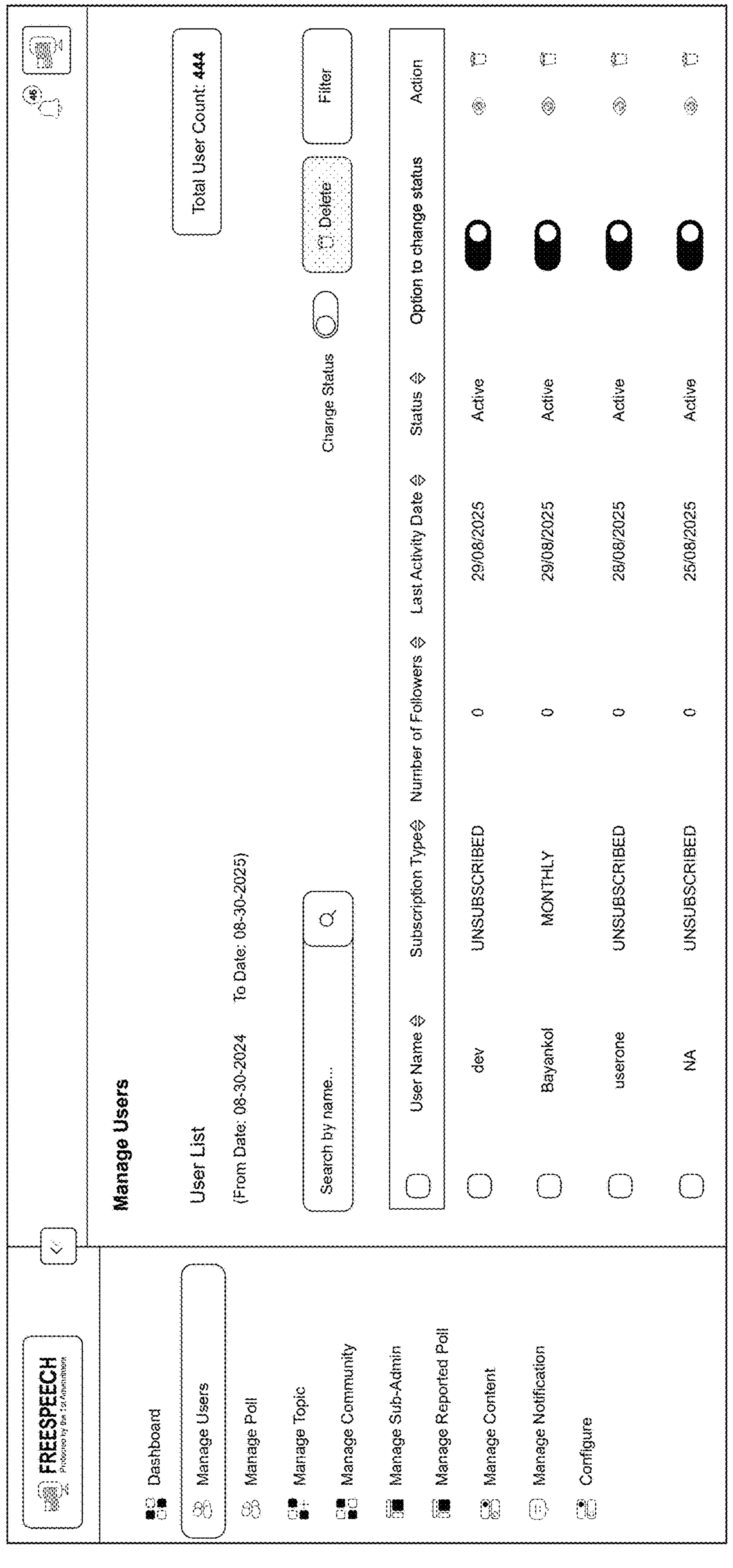
FIG. 6B illustrates an administrator user interface for managing users according to an example of the present technology.

FIG. 6B illustrates an administrator user interface for managing users according to an example of the present technology. The user interface for managing users may display a user list including for each user: user name, subscription type, number of followers, last activity date, status, option to change status of the user, and one or more actions that can be taken. The user interface for managing users may include options for filtering the list of displayed users based on one or more user parameters, activity date and/or type, and for searching for users.

Figure 6C:
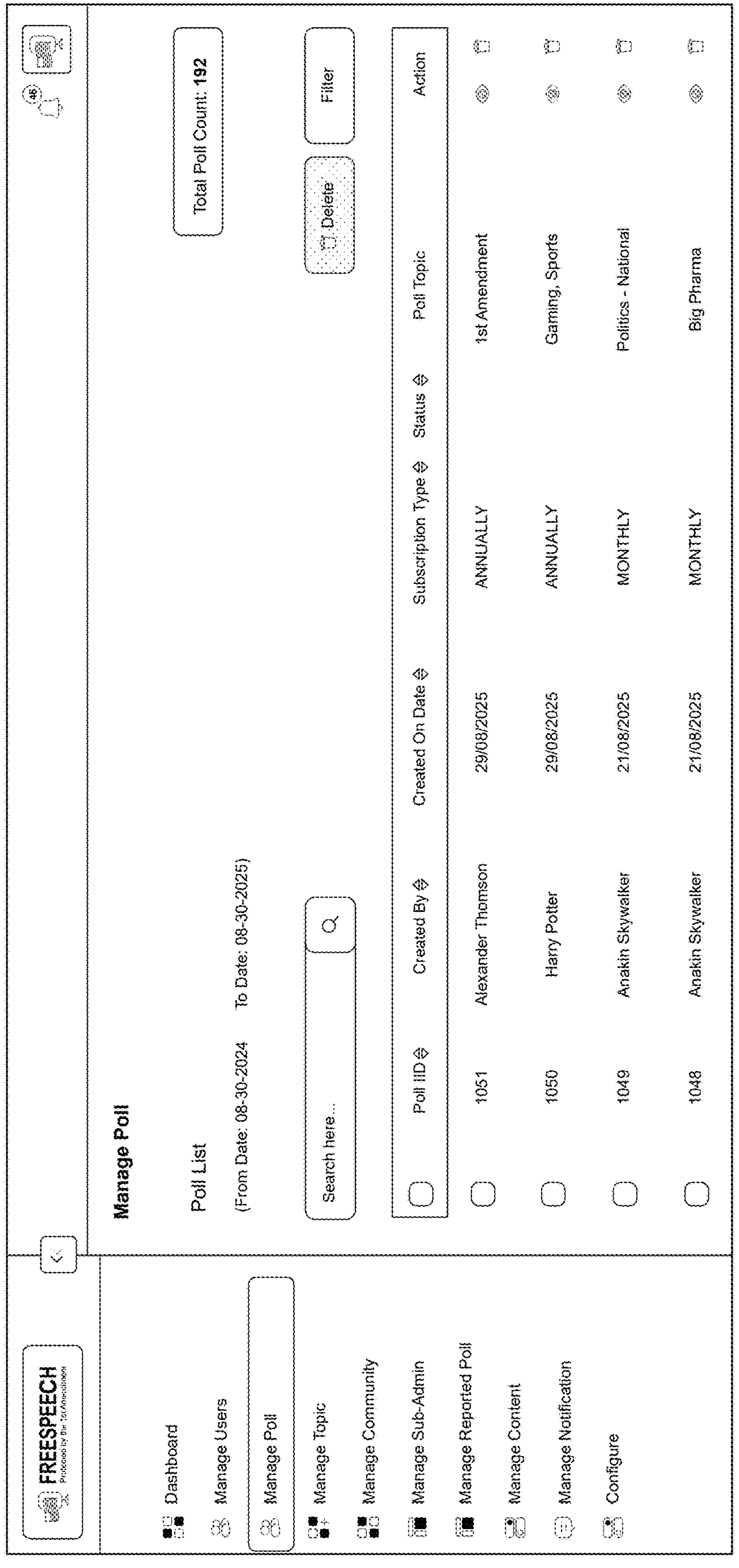
FIG. 6C illustrates an administrator user interface for managing polls according to an example of the present technology.

FIG. 6C illustrates an administrator user interface for managing polls according to an example of the present technology. The administrator user interface for managing polls includes polls created by the different users. The user poll list provides poll identification number, real name and/or username of the poll creator, creation date, type of user subscription, poll topic(s), and actions that can be taken in relation to each pole. The user interface may provide an option to search the poll list and/or filter the polls that are displayed by user, creation time, expiration time, subscription type, words in poll, and/or actions taken for the polls.

Figure 6D:
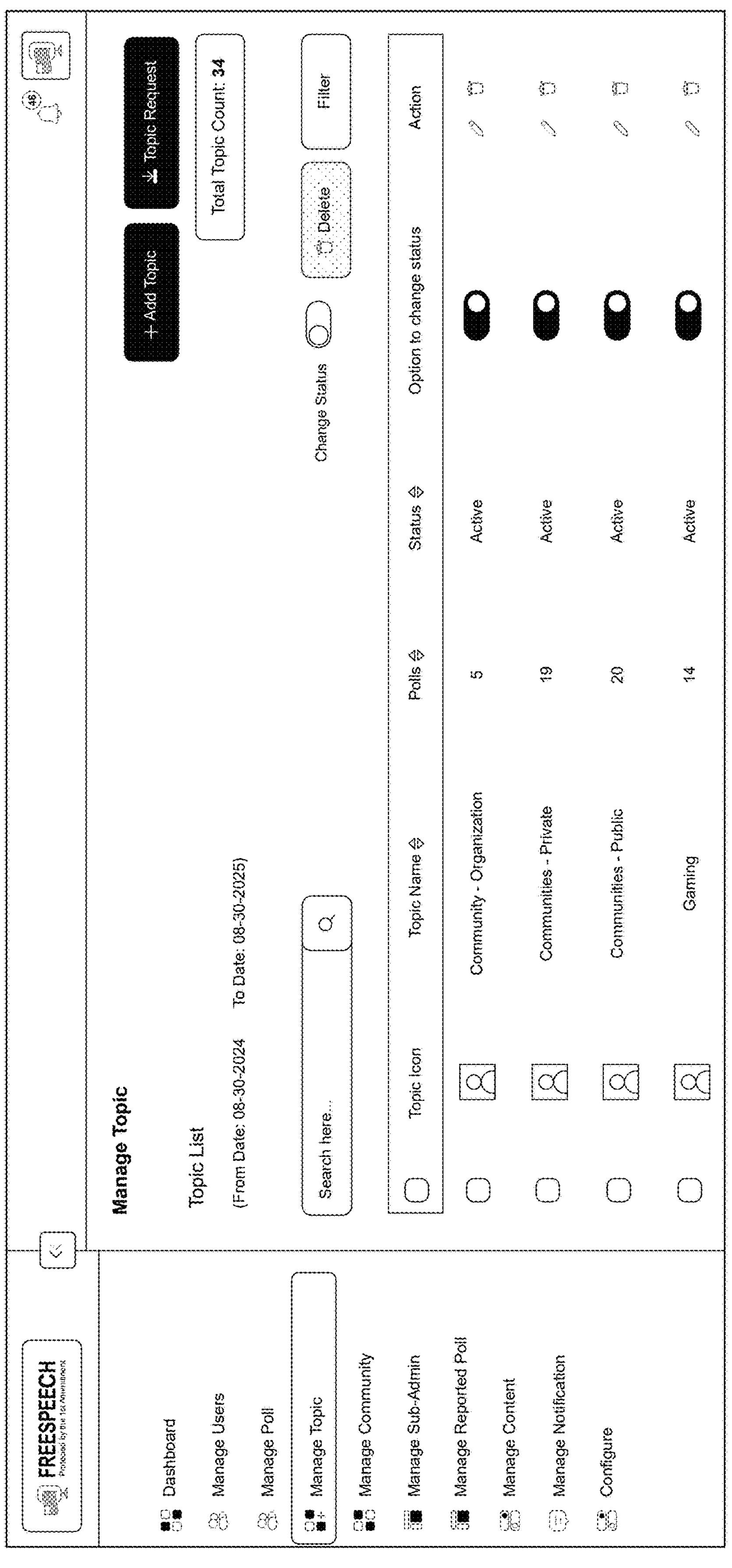
FIG. 6D illustrates an administrator user interface for managing topics according to an example of the present technology.

FIG. 6D illustrates an administrator user interface for managing topics according to an example of the present technology. The user interface for managing topics may include topic icon, topic name, number of polls associated with the topic, status of the topic, option for changing the status of the topic, and actions that can be taken in relation to each topic. The user interface may provide an option to search the topic list and/or filter the topics that are displayed by topic name, topic description, user who created the topic, users who are associated with the topic(s), creation time, expiration time, and/or actions taken for the topics.

Figure 6E:
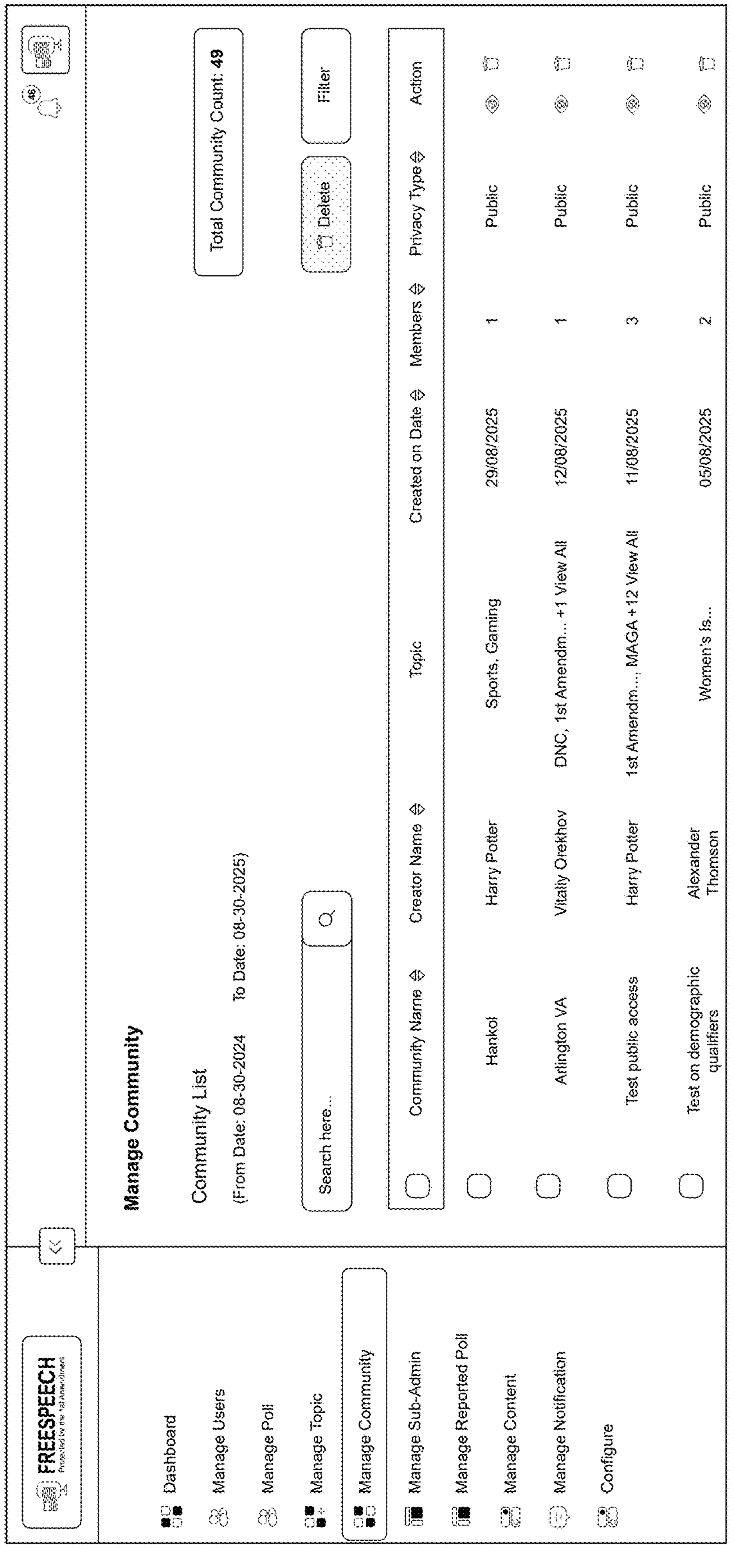
FIG. 6E illustrates an administrator user interface for managing communities according to an example of the present technology.

FIG. 6E illustrates an administrator user interface for managing communities according to an example of the present technology. The user interface for managing communities may include community icon, community name, creator of the community, number of members community, creation date, topics associated with the community, privacy type, and actions that can be taken in relation to each community. The actions that can be taken in relation to the communities may include seeing additional details about communities, removing the communities, and displaying additional information for taking specific actions with regard to the communities. The user interface may provide an option to search the community list and/or filter the communities that are displayed by community name, topics associated with the community, user who created the community, user(s) who administer the community, user(s) who are associated with the communities, creation time, and/or actions taken for the community.

Figure 6F:
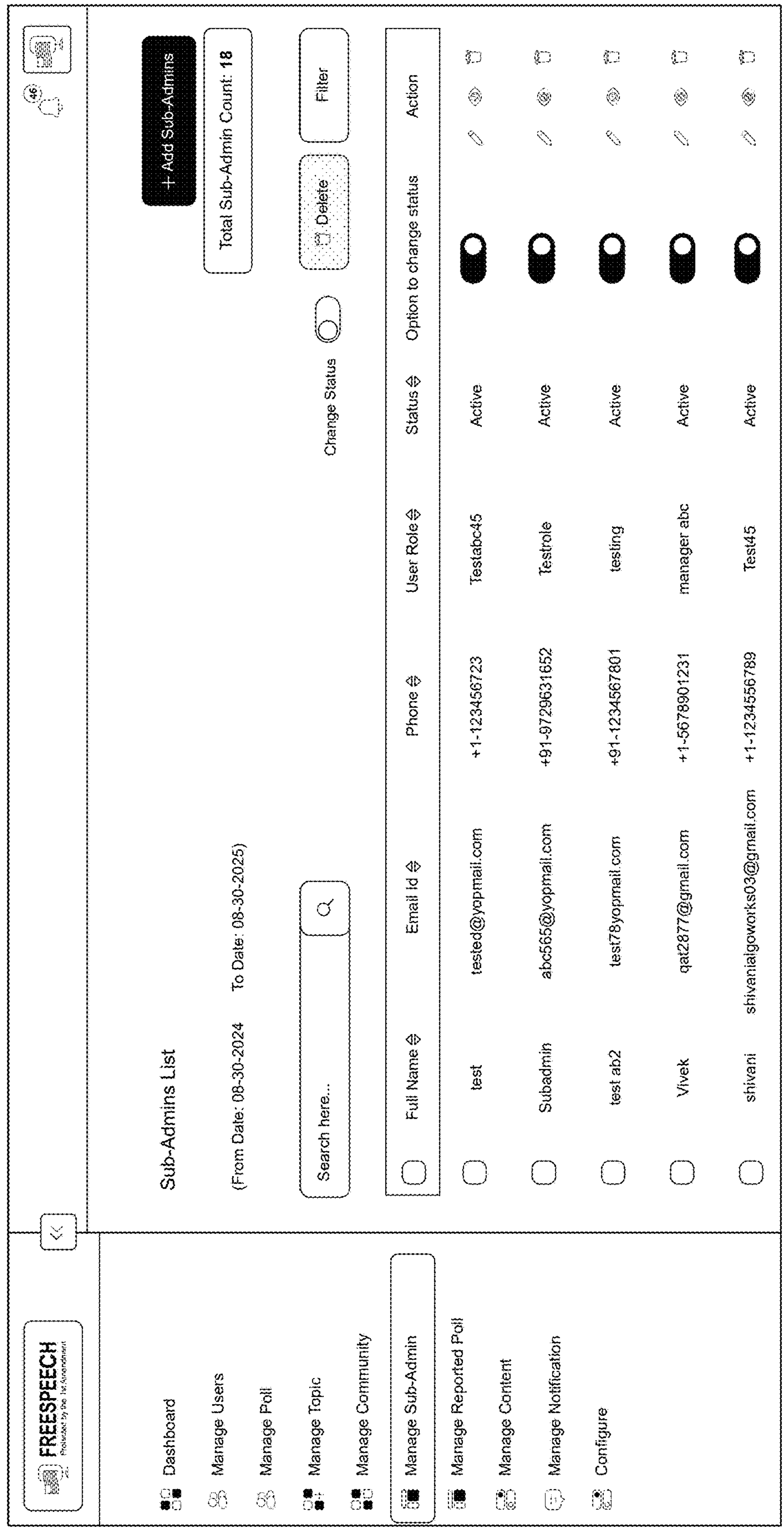
FIG. 6F illustrates an administrator user interface for managing sub-administrators according to an example of the present technology.

FIG. 6F illustrates an administrator user interface for managing sub-administrators according to an example of the present technology. The user interface for managing for managing sub-administrators may include for each sub-administrator: name and/or username, contact information (e.g., email and/or phone number), user role, status, option to change stats, and actions that can be taken in relation to each sub-administrator. The actions that can be taken in relation to the sub-administrator may include seeing additional details about the sub-administrator, removing the sub-administrator, and displaying additional information for taking actions with regard to the sub-administrator. The user interface may provide an option to search the sub-administrators list and/or filter the sub-administrators that are displayed by name, communities associated with the sub-administrators, topics associated with the sub-administrators, status of the sub-administrators, dates of last activity, and/or actions taken for the sub-administrators.

Figure 7:
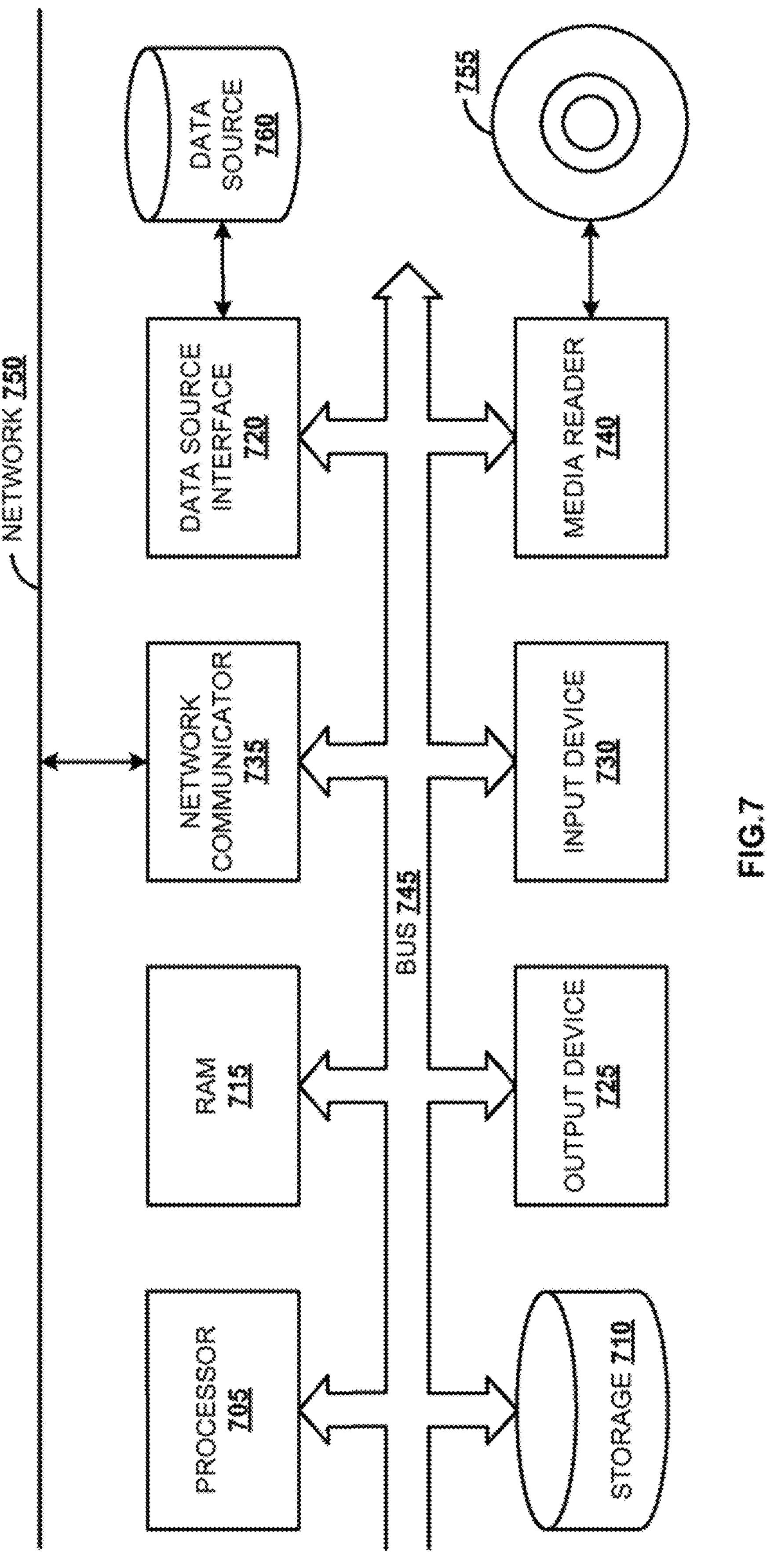
FIG. 7 is a block diagram of an exemplary computer system.

FIG. 6G illustrates an administrator user interface for managing reported polls according to an example of the present technology. The polls may be reported by user(s) for review by administrators and/or sub-administrators. As shown in FIG. 6G, the user interface may include a poll ID, who it is reported by, report date and/or time, status of the report (e.g., open, resolved, and actions that can be taken in relation to reported poll. The actions that can be taken in relation to reported poll may include seeing additional details about the report and displaying additional information for taking action with regard to the report. The user interface may provide an option to search the reported poll list and/or filter the reported poll list that are displayed by poll ID, date reported, date resolved, name of person who created the poll and/or reported the poll, and/or status of the poll. FIG. 7 is a block diagram of an exemplary computer system 700. The computing system 700 may include a mobile and/or handheld device, a cloud system, a server, or a terminal that is coupled to a remote processing system. The computer system 700 may correspond to the processing system 110 and/or the user devices 150*a*, 150*b*, 150*c*. One or more components illustrated in the exemplary computer system 700 may be provided externally to the computer system 700.

The computer system 700 may include at least one processor 705 comprising processing circuitry that executes software instructions or code stored on a computer readable storage medium 755 to perform the methods illustrated in this application. The processor 705 can include a plurality of cores and/or a plurality of processors comprising processing circuitry configured to, individually and/or collectively, to perform the operations of the disclosed methods. The one or more processors may include a central processing unit (CPU), a graphics processing unit (GPU), microcontroller, and/or microprocessor. The one or more processors may include a processor configured to perform machine learning or AI/LLM functionality based on data stored in the computer system 700 and/or data received from other sources. The one or more processors 705 may be configured to receive use information related to use of a device, identifying one or more detectable patterns based on the received use information, and outputting information indicating that a pattern is detectable and/or obfuscating recommendation (s).

The computer system 700 may include a media reader 740 to read the instructions from the computer readable storage medium 755 and store the instructions in storage 710 or in random access memory (RAM) 715. The storage 710 provides a large space for keeping static data where at least some instructions could be stored for later execution. According to some embodiments, such as some in-memory computing system embodiments, the RAM 715 can have sufficient storage capacity to store much of the data required for processing in the RAM 715 instead of in the storage 710. In some embodiments, all of the data required for processing may be stored in the RAM 715. The stored instructions may be further compiled to generate other representations of the instructions and dynamically stored in the RAM 715. The at least one processor 705 reads instructions from the RAM 715 and performs actions as instructed.

According to one embodiment, the computer system 700 further includes an output device 725 (e.g., a display or a speaker) to provide at least some of the results of the execution as output including, but not limited to, visual and/or audio information to user(s) and an input device 730 to provide a user or another device with means for entering data and/or otherwise interact with the computer system 700. In some examples, the output device 725 and the input device 730 may be provided as a touch screen display. The output device 725 may use to output the various screens of the present application to the user, administrator, and/or sub-administrator. The input device 730 may be used to receive user inputs selecting notification(s), polls, polls response, communities.

In some examples, the input device 730 and/or the output device 725 may be provided externally to the computing system 700 and the computing system 700 may receive and/or send information to the input device 730 and/or the output device 725. Each of these output devices 725 and input devices 730 could be joined by one or more additional peripherals to further expand the capabilities of the computer system 700. The input device 730 may include one or more cameras and/or other sensors configured to capture data that can be used to determine use information. A network communicator 735 may be provided to connect the computer system 700 to a network 750 and in turn to other devices connected to the network 750 including other clients, servers, data stores, and interfaces, for instance. The modules of the computer system 700 are interconnected via a bus 745.

The computer system 700 may include a data source interface 720 to access data source 760. The data source 760 can be accessed via one or more abstraction layers implemented in hardware or software. For example, the data source 760 may be accessed by network 750. In some embodiments the data source 760 may be accessed via an abstraction layer, such as, a semantic layer. A data source is an information resource. The data source 760 may store historical use information, ML models, and/or determined patterns. Data sources include sources of data that enable data storage and retrieval. Data sources may include databases, such as, relational, transactional, hierarchical, multi-dimensional, object oriented databases, and the like.

The computer system 700 may be implemented in an augmented reality (AR) or virtual reality (VR) device. AR is an interactive experience of a real-world environment where the objects that reside in the real world may be enhanced by computer-generated perceptual information.

One or more operations described in this application may be performed by a processing system 700 including one or more processors (e.g., processors 705) coupled to memory. In some examples, the one or more processors may be a distributed system and/or include a cloud computing system. The processing system may include hardware and/or software confirmed to perform machine learning and/or use artificial intelligence to perform one or more operations. One or more operations described in this application may be performed based on one or more trained ML/AI models. The models may be trained based on stored data, previously detected patterns, and/or data received in real time.

The processing system may provide an application for targeted opinion polling with anonymity based on one or more operations described in this application. The present technology described herein may provide one or more of the following features and/or advantages: verified identity and true anonymity through authentication of one real person who is provided one vote and preventing users (e.g., even administrators) from seeing how specific users voted; polling is configured for constituent-level targeting and communities with polls aimed at actual represented populations and with optional public and private communities; system can be built for policy influence, not official ballot casting for avoiding government and/or administrative online-voting restrictions and focusing on real-time, shareable sentiment; aligning incentives by providing no advertisements and/or data brokerage by optionally utilizing subscription funding from users and/or administrators to ensures independence; avoiding security pitfalls that can be found in official ballot-return mobile application while still maintaining strong verification and privacy; reducing hardware needed for storage and/or additional security by not associating poll voting results with users. In some examples, a combination of features provided in the system may include providing: verified identity (third party service), guaranteed anonymity of each vote (even from admins), constituent/demographic targeting, real-time sentiment, and an ad-free, member-funded model built for everyday civic influence rather than running official elections or decision making by a government, company or other entity. It will be appreciated that as used herein, the terms system, subsystem, service, engine, module, programmed logic circuitry, and the like may be implemented as any suitable combination of software, hardware, firmware, and/or the like. It also will be appreciated that the storage locations, stores, and repositories discussed herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

In the above description, numerous specific details are set forth to provide a thorough understanding of embodiments. The person skilled in the art realizes that the examples of the present technology are by no means limited to the preferred embodiments described above. On the contrary, many modifications and variations are possible within the scope of the appended claims. Additionally, variations to the disclosed embodiments can be understood and effected by the skilled person in practicing the claimed invention, from a study of the drawings, the disclosure, and the appended claims.

What is claimed is:

1. A system for polling a population of people, the system comprising:

at least one server configured to communicate over a network with a plurality of user devices associated with a plurality of users, wherein the at least one server comprises at least one processor comprising processing circuitry and non-transitory computer readable storage medium storing instructions that, when executed by the at least one processor, cause the at least one server to:

receive, over the network from the plurality of user devices associated with the plurality of users, registration information for the plurality of users;

transmit, over the network to a verification service, the registration information for the plurality of users;

receive, over the network from the verification service, confirmation of identities of the plurality of users;

receive, over the network from a first user device associated with a first user among the plurality of users, a request to create a first poll, the request including a community, one or more poll topics, at least one question, a plurality of responses for each question, first poll expiration information, respondent age group for the first poll, and respondent gender for the first poll;

in response to receiving the request, transmit, over the network, information about the first poll to user devices among the plurality of user devices associated with users that belong to the community;

receive from at least a portion of the user devices among the plurality of user devices associated with the users that belong to the community, response information to the at least one question;

generate a report of responses to the first poll based on the received response information without associating user identities of the users that belong to the community with the responses; and transmit information about the report to the user devices among the plurality of user devices associated with users that belong to the community.

2. The system of claim 1, wherein the community is a geographic region.

3. The system of claim 1, wherein the community is an organization.

4. The system of claim 1, wherein each community is associated with a plurality of topics.

5. The system of claim 1, wherein the instructions, when executed by the at least one processor, causes the at least one server to:

confirm that the users belong to the community based on information received from the verification service in response to the transmitting of the registration information for the plurality of users.

6. The system of claim 1, wherein the response information to the at least one question is received without the response information being associated with the users that belong to the community.

7. The system of claim 1, wherein the request to create the first poll includes an indication whether to share identity of the first user with the poll.

8. The system of claim 1, wherein the request to create the first poll includes an indication whether to display identity of the first user with the poll.

9. The system of claim 1, wherein the request to create the first poll includes whether to display poll results to respondents, and respondent geographic information, wherein the information about the first poll is transmitted to user devices among the plurality of user devices satisfying the respondent age group for the first poll, the respondent gender for the first poll, and the respondent geographic information.

10. The system of claim 1, wherein the request to create the first poll includes a purpose statement for the first poll entered by the first user.

11. A user device comprising:

a display;

communication circuitry configured to communicate over a network with a server;

at least one processor comprising processing circuitry; and non-transitory computer readable storage medium storing instructions that, when executed by the at least one processor, cause the user device to:

receive, based on user inputs made into a registration screen displayed on the display, user registration information for a user, the user registration information including user's name, date of birth, and contact information;

transmit, to the server over the network, a request to authenticate an identity of the user using a verification service;

after the identity of the user is authenticated, associate, based on user inputs into a community selection screen displayed on the display, the user with one or more communities from a plurality of communities;

receive a notification indicating availability of one or more polls associated with the one or more communities associated with the user;

in response to the user selecting a first poll among the one or more polls associated with the one or more communities associated with the user, simultaneously display a question and a plurality of selectable responses of the first poll on the display, wherein the first poll includes first poll expiration information, respondent age group for the first poll, and respondent gender for the first poll;

receive a user input selecting at least one of the displayed plurality of selectable responses of the first poll;

in response to receiving the user input selecting the at least one of the displayed plurality of selectable response, transmit, to the server over the network, information indicating the selected at least one response;

after transmitting the information indicating the selected at least one response, receive, from the server over the network, a report of responses to the first poll received from a plurality of users, wherein the report of responses is generated without associating user identities of the plurality of users; and display, on the display, the report of the responses to the first poll.

12. The user device of claim 11, wherein the instructions, when executed by the at least one processor, cause the user device to:

receive, based on user inputs into a poll creation screen displayed on the display, a request to create a second poll, the request including a second poll community, one or more poll topics, at least one question, and a plurality of responses for each question;

in response to receiving the request to create the second poll, transmit, to the server over the network, information about the request for the second poll;

receive, from the server over the network, a report of responses to the second poll received from a plurality of users that belong to the second poll community, wherein the report of responses to the second poll is generated without associating user identities of the plurality of users that belong to the second poll community; and display, on the display, the report of the responses to the second poll.

13. The user device of claim 12, wherein the second poll community is a geographic region or an organization.

14. The user device of claim 11, wherein each community of the plurality of communities is associated with a plurality of topics.

15. The user device of claim 11, wherein the plurality of communities from which the user selects the one or more communities are provided based on the information received from the verification service in response to the transmitting of the user identifying information.

16. The user device of claim 12, wherein the request to create the second poll includes second poll expiration information, respondent age group for the second poll, and respondent gender for the second poll.

17. The user device of claim 12, wherein the request to create the second poll includes indication whether to share identity of the user creating the second poll with the plurality of users that belong to the second poll community.

18. The user device of claim 12, wherein the request to create the second poll includes second poll expiration information, whether to display poll results to respondents of the second poll, respondent age group for the second poll, respondent gender for the second poll, and respondent geographic information for the second poll, wherein the plurality of users that belong to the second poll community include users satisfying the respondent age group for the second poll, the respondent gender for the second poll, and the respondent geographic information for the second poll.

19. The user device of claim 12, wherein the request to create the second poll includes second poll expiration information and purpose statement for the second poll entered by the user.

20. A non-transitory computer readable medium having instructions stored thereon that, when executed by at least one server comprises at least one processor comprising processing circuitry, perform a method comprising:

receiving, over a network from a plurality of user devices associated with a plurality of users, registration information for the plurality of users;

transmitting, over the network to a verification service, the registration information for the plurality of users;

receiving, over the network from the verification service, confirmation of identities of the plurality of users;

receiving, over the network from a first user device associated with a first user among the plurality of users, a request to create a first poll, the request including a community, one or more poll topics, at least one question, a plurality of responses for each question, first poll expiration information, respondent age group for the first poll, and respondent gender for the first poll;

in response to receiving the request, transmitting, over the network, information about the first poll to user devices among the plurality of user devices associated with users that belong to the community;

receiving from at least a portion of the user devices among the plurality of user devices associated with the users that belong to the community, response information to the at least one questions;

generating a report of responses to the first poll based on the received response information without associating user identities of the users that belong to the community with the responses; and transmitting information about the report to the user devices among the plurality of user devices associated with users that belong to the community.

* * * * *